United States Patent
Mitsunaga

(10) Patent No.: US 12,474,367 B2
(45) Date of Patent: Nov. 18, 2025

(54) INERTIAL SENSOR MODULE AND INERTIAL MEASUREMENT SYSTEM

(71) Applicant: SEIKO EPSON CORPORATION, Tokyo (JP)

(72) Inventor: Shinichi Mitsunaga, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 289 days.

(21) Appl. No.: 18/341,021

(22) Filed: Jun. 26, 2023

(65) Prior Publication Data

US 2023/0417794 A1 Dec. 28, 2023

(30) Foreign Application Priority Data

Jun. 27, 2022 (JP) ................................. 2022-102481

(51) Int. Cl.
*G01P 15/125* (2006.01)
*G01P 15/14* (2013.01)
*G01P 15/18* (2013.01)

(52) U.S. Cl.
CPC ............ *G01P 15/125* (2013.01); *G01P 15/14* (2013.01); *G01P 15/18* (2013.01)

(58) Field of Classification Search
CPC ........ G01P 15/125; G01P 15/14; G01P 15/18; G01C 19/5776; G01C 21/16
See application file for complete search history.

(56) References Cited

U.S. PATENT DOCUMENTS

| 5,790,405 A * | 8/1998 | Buchler ............... G01C 21/185 |
| | | 702/147 |
| 2016/0217102 A1* | 7/2016 | Eguchi ................ G06F 13/4282 |
| 2019/0285663 A1* | 9/2019 | Chino ................. G01P 15/0888 |
| 2020/0033825 A1 | 1/2020 | Otani et al. |

FOREIGN PATENT DOCUMENTS

JP 2016-031358 A 3/2016

\* cited by examiner

*Primary Examiner* — Xin Y Zhong
(74) *Attorney, Agent, or Firm* — Harness, Dickey & Pierce, P.L.C.

(57) ABSTRACT

An inertial sensor module includes: a first inertial sensor; a second inertial sensor; and a processing device configured to receive a first detection signal output from the first inertial sensor and a second detection signal output from the second inertial sensor, and output measurement data based on the first detection signal and the second detection signal and based on output instruction information received from outside. The processing device is configured to output the measurement data in a format corresponding to output format selection information received from the outside.

9 Claims, 11 Drawing Sheets

FIG. 2
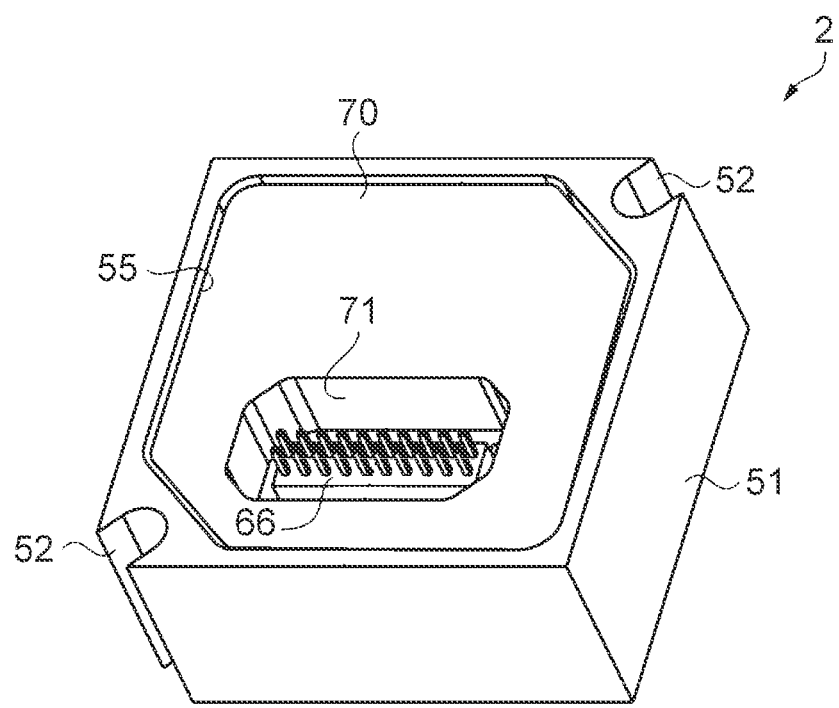
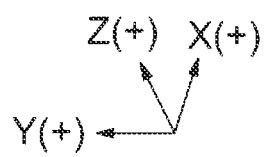

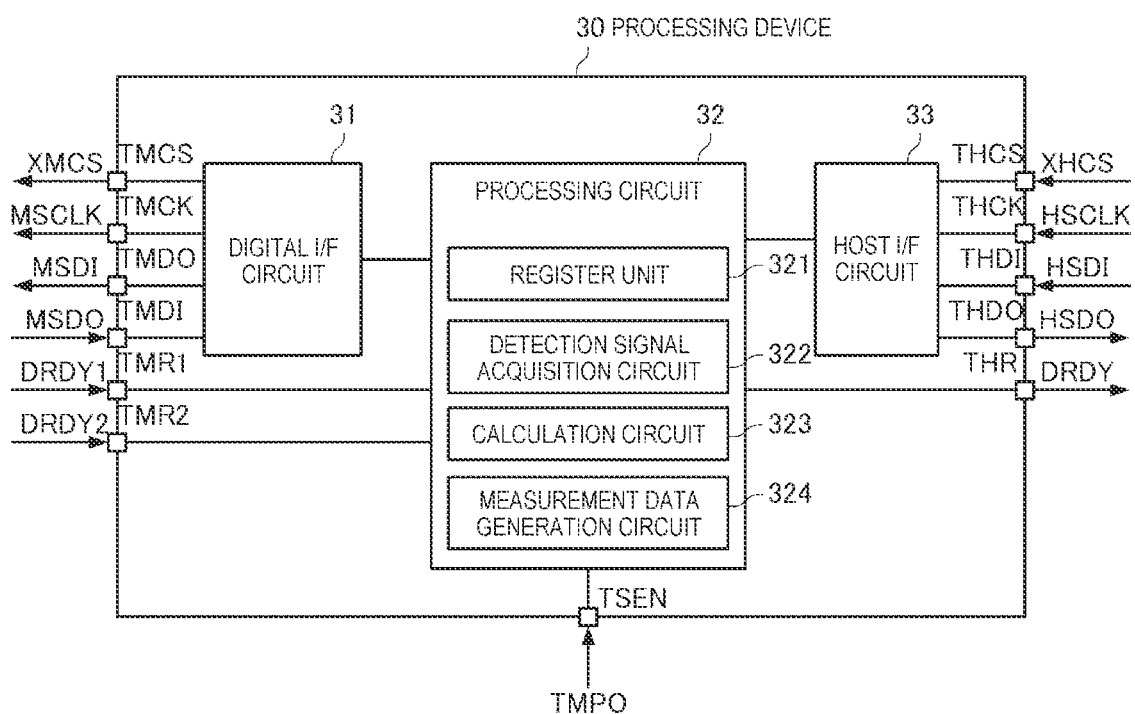

FIG. 8

| | | | | | | | |
|---|---|---|---|---|---|---|---|
| FIRST FORMAT: | $G_{X1}$ | $G_{Y1}$ | $G_{Z2}$ | $A_{X1}$ | $A_{Y1}$ | $A_{Z1}$ | $G_{Z1}$ |
| SECOND FORMAT: | $G_{X1}$ | $G_{Y1}$ | $G_{Z2}$ | $A_{X1}$ | $A_{Y1}$ | $A_{Z1}$ | TP |
| THIRD FORMAT: | $G_{X1}$ | $G_{Y1}$ | $G_{Z1}$ | $A_{X1}$ | $A_{Y1}$ | $A_{Z1}$ | TP |

| | | | | | | | | | | | | |
|---|---|---|---|---|---|---|---|---|---|---|---|---|
| FOURTH FORMAT: | $G_{X1}$ | $G_{Y1}$ | $G_{Z1}$ | $G_{Z2}$ | $A_{X1}$ | $A_{Y1}$ | $A_{Z1}$ | $G_{X1}'$ | $G_{Y1}'$ | $G_{Z1}'$ | $A_{X1}'$ | $A_{Y1}'$ | $A_{Z1}'$ | $G_{Z2}'$ |

FIG. 9

| | | | | | | | | | | | | | |
|---|---|---|---|---|---|---|---|---|---|---|---|---|---|
| FIRST FORMAT: | $G_{X1}$ | $G_{Y1}$ | $G_{Z2}$ | $A_{X1}$ | $A_{Y1}$ | $A_{Z1}$ | $G_{Z1}$ | | | | | | |
| SECOND FORMAT: | $G_{X1}$ | $G_{Y1}$ | $G_{ZZ}$ | $A_{X1}$ | $A_{Y1}$ | $A_{Z1}$ | TP | | | | | | |
| THIRD FORMAT: | $G_{X1}$ | $G_{Y1}$ | $G_{Z1}$ | $A_{X1}$ | $A_{Y1}$ | $A_{Z1}$ | TP | | | | | | |
| FOURTH FORMAT: | $G_{X1}$ | $G_{Y1}$ | $G_{Z1}$ | $A_{X1}$ | $A_{Y1}$ | $A_{Z1}$ | $G_{Z2}$ | $G_{X1}$ | $G_{Y1}$ | $G_{Z1}$ | $A_{X1}'$ | $A_{Y1}'$ | $A_{Z1}'$ | $G_{ZZ}'$ |
| FIFTH FORMAT: | $G_{X1}$ | $G_{Y1}$ | $G_{ZZ}$ | $A_{X1}$ | $A_{Y1}$ | $A_{Z1}$ | TP | $R_1$ | $P_1$ | $Y_2$ | $\theta_{X1}$ | $\theta_{Y1}$ | $\theta_{ZZ}$ |
| SIXTH FORMAT: | $G_{X1}$ | $G_{Y1}$ | $G_{Z1}$ | $A_{X1}$ | $A_{Y1}$ | $A_{Z1}$ | TP | $R_1$ | $P_1$ | $Y_1$ | $\theta_{X1}$ | $\theta_{Y1}$ | $\theta_{Z1}$ |

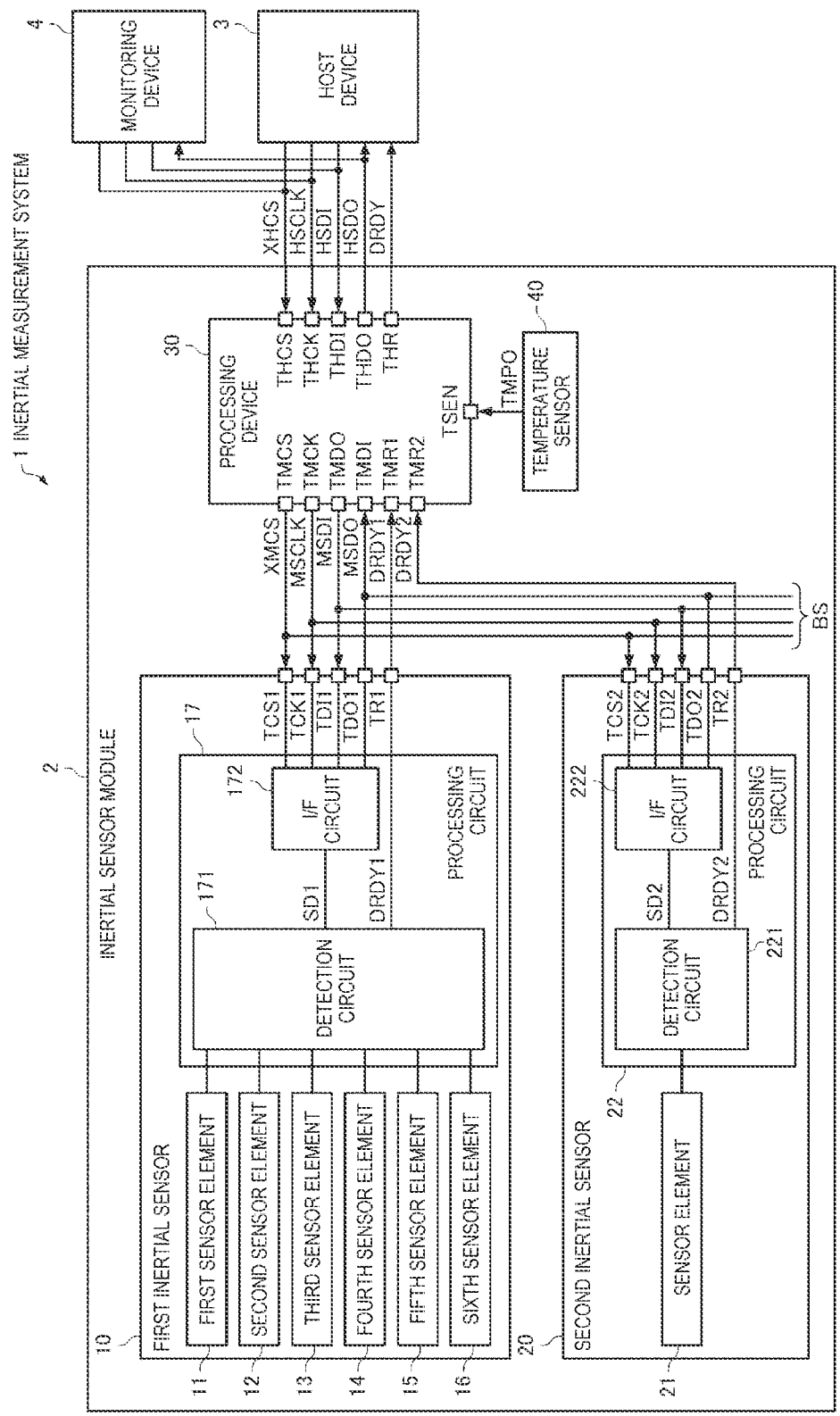

INERTIAL SENSOR MODULE AND INERTIAL MEASUREMENT SYSTEM

The present application is based on, and claims priority from JP Application Serial Number 2022-102481, filed Jun. 27, 2022, the disclosure of which is hereby incorporated by reference herein in its entirety.

BACKGROUND

1. Technical Field

The present disclosure relates to an inertial sensor module and an inertial measurement system.

2. Related Art

JP-A-2016-31358 discloses an inertial sensor module including an inertial sensor and an IC chip that outputs a predetermined signal based on a signal from the inertial sensor.

In recent years, use of an inertial sensor module is diversified. It is desired that a host device coupled to the inertial sensor module can select and acquire a series of necessary data among various types of data generated inside the inertial sensor module according to the use. However, the inertial sensor module disclosed in JP-A-2016-31358 outputs a predetermined signal, and cannot change a format of the output signal.

SUMMARY

An aspect of an inertial sensor module according to the present disclosure includes: a first inertial sensor; a second inertial sensor; and a processing device configured to receive a first detection signal output from the first inertial sensor and a second detection signal output from the second inertial sensor, and output measurement data based on the first detection signal and the second detection signal and based on output instruction information received from outside. The processing device is configured to output the measurement data in a format corresponding to output format selection information received from the outside.

According to an aspect of the present disclosure, an inertial measurement system includes: an aspect of the inertial sensor module; and a monitoring device configured to monitor the measurement data and transmit the output format selection information according to a monitoring result to the processing device.

BRIEF DESCRIPTION OF THE DRAWINGS

FIG. 2 is a perspective view of the inertial sensor module observed from a mounted surface side.

FIG. 6 is a diagram showing a configuration example of a processing device.

FIG. 7 is a diagram showing an example of a format of measurement data in the first embodiment.

FIG. 8 is a diagram showing an example of a format of measurement data in a second embodiment.

FIG. 9 is a diagram showing an example of a format of measurement data in a third embodiment.

FIG. 10 is a diagram showing a configuration of an inertial measurement system according to a fourth embodiment.

DESCRIPTION OF EXEMPLARY EMBODIMENTS

Hereinafter, preferred embodiments of the present disclosure will be described in detail with reference to the drawings. The embodiments to be described below do not unduly limit contents of the present disclosure described in the claims. Not all configurations to be described below are necessarily essential components of the present disclosure.

1. First Embodiment

1-1. Structure of Inertial Sensor Module

Figure 1:
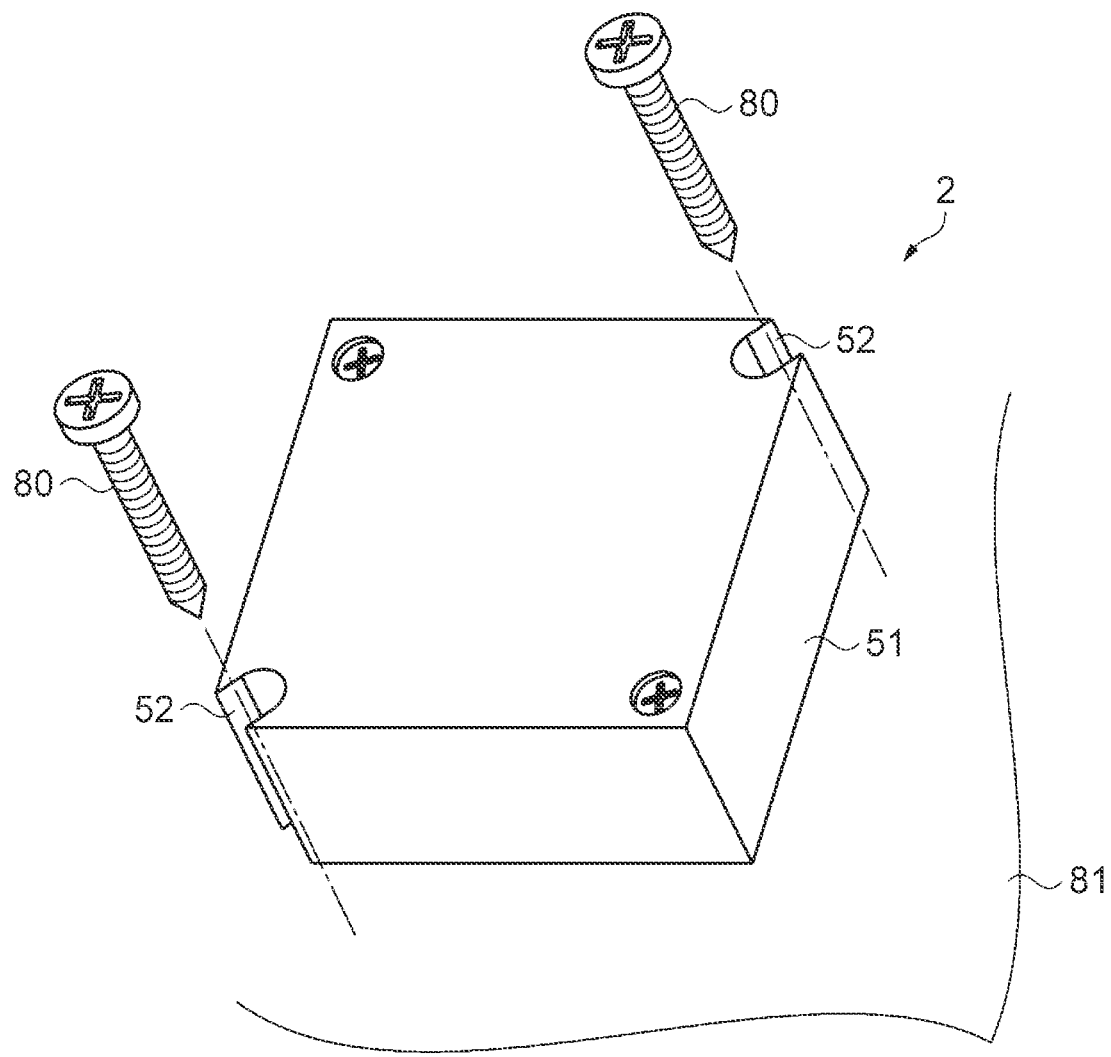
FIG. 1 is a perspective view showing a state in which an inertial sensor module according to a first embodiment is fixed to a mounted surface.

FIG. 1 is a perspective view showing a state in which an inertial sensor module used in an inertial measurement system according to a first embodiment is fixed to a mounted surface. FIG. 2 is a perspective view of the inertial sensor module observed from a mounted surface side. First, an outline of an inertial sensor module 2 according to the first embodiment will be described. The inertial sensor module 2 detects a behavior of an object on which the inertial sensor module 2 is to be mounted such as an automobile or a robot.

As shown in FIG. 1, the inertial sensor module 2 is a rectangular parallelepiped body whose planar shape is substantially square, and is compact such that a length of one side of the square is about centimeters. Notch holes 52 are provided at two places in a diagonal direction of the inertial sensor module 2. The inertial sensor module 2 is fixed to a mounted surface 81 of an object on which the inertial sensor module 2 is to be mounted such as an automobile by two screws 80 inserted into the notch holes 52. The object on which the inertial sensor module 2 is to be mounted is not limited to a moving body such as an automobile, and may be a building such as a bridge or an elevated track. When the inertial sensor module 2 is attached to a building, the inertial sensor module 2 is used as a structural health monitoring system that checks soundness of the building.

As shown in FIG. 2, the inertial sensor module 2 has a configuration in which an inner case 70 is accommodated in a rectangular parallelepiped outer case 51. A rectangular opening 71 is formed in the inner case 70. Hereinafter, a long-side direction of the opening 71 is referred to as a Y(+) direction. In addition, a direction orthogonal to the Y(+) direction is referred to as an X(+) direction, and a thickness direction of the outer case 51 is referred to as a Z(+) direction, which are indicated by coordinate axes. A plug connector 66 is exposed from the opening 71 of the inner case 70, and the Y(+) direction coincides with an arrangement direction of a plurality of pins in the connector 66. The coordinate axis is a detection axis of the inertial sensor module 2.

Figure 3:
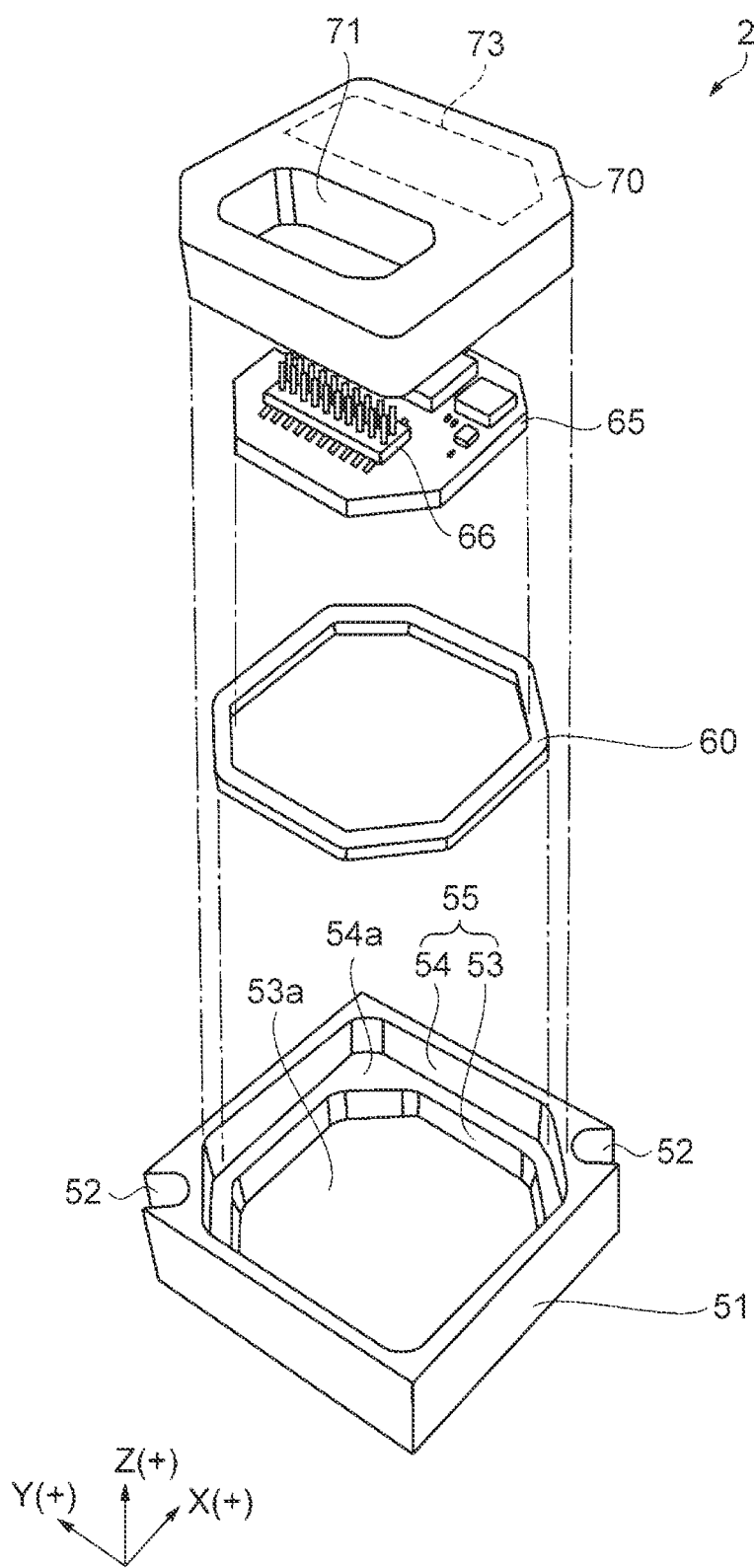
FIG. 3 is an exploded perspective view of the inertial sensor module.

FIG. 3 is an exploded perspective view of the inertial sensor module 2. As shown in FIG. 3, the inertial sensor module 2 includes the outer case 51, a joint member 60, a circuit board 65, and the inner case 70.

The outer case 51 is a box-shaped housing having a rectangular parallelepiped outer shape. A material of the outer case 51 is, for example, aluminum, and may be other metals or ceramics. The two notch holes 52 described above are formed on an outer side of the outer case 51. A through-hole such as a round hole may be formed in the outer case 51, and the through-hole may be screwed. Alternatively, a flange may be formed on a side surface of the outer case 51, and the flange portion may be screwed.

The outer case 51 is provided with a storage portion 55 for storing the inner case 70 in a state in which the circuit board 65 is set. The storage portion 55 includes a first concave portion 53 having a bottom portion 53a as a bottom surface and a second concave portion 54 having a receiving portion 54a surrounding the first concave portion 53. The circuit board 65 is stored in the first concave portion 53. The receiving portion 54a is a receiving portion of the ring-shaped inner case 70 rising stepwise from the bottom portion 53a, and the inner case 70 is stored in the second concave portion 54 via the joint member 60. The joint member 60 is a buffer member made of resin and disposed between the outer case 51 and the inner case 70. The joint member 60 is a ring-shaped member similar to the receiving portion 54a, and is set on the receiving portion 54a.

The inner case 70 is a member that supports the circuit board 65, and is formed in a shape that can be stored in the second concave portion 54 of the outer case 51. The inner case 70 is made of a material the same as that of the outer case 51. The inner case 70 is provided with the opening 71 for exposing the connector 66 of the circuit board 65 to the outside, and a third concave portion 73 for storing electronic components mounted on the circuit board 65. The third concave portion 73 is actually filled with resin, and illustration thereof is omitted in FIG. 3. In addition, the first concave portion 53 of the storage portion 55 in the outer case 51 can also be filled with resin in the same manner, and illustration thereof is omitted in FIG. 3.

With such a configuration, in a state in which the inner case 70 including the circuit board 65 is stored and integrated in the outer case 51, as shown in FIG. 1, the inertial sensor module 2 is used by being fixed to the mounted surface 81 of the object on which the inertial sensor module 2 is to be mounted by the two screws 80.

Figure 4:
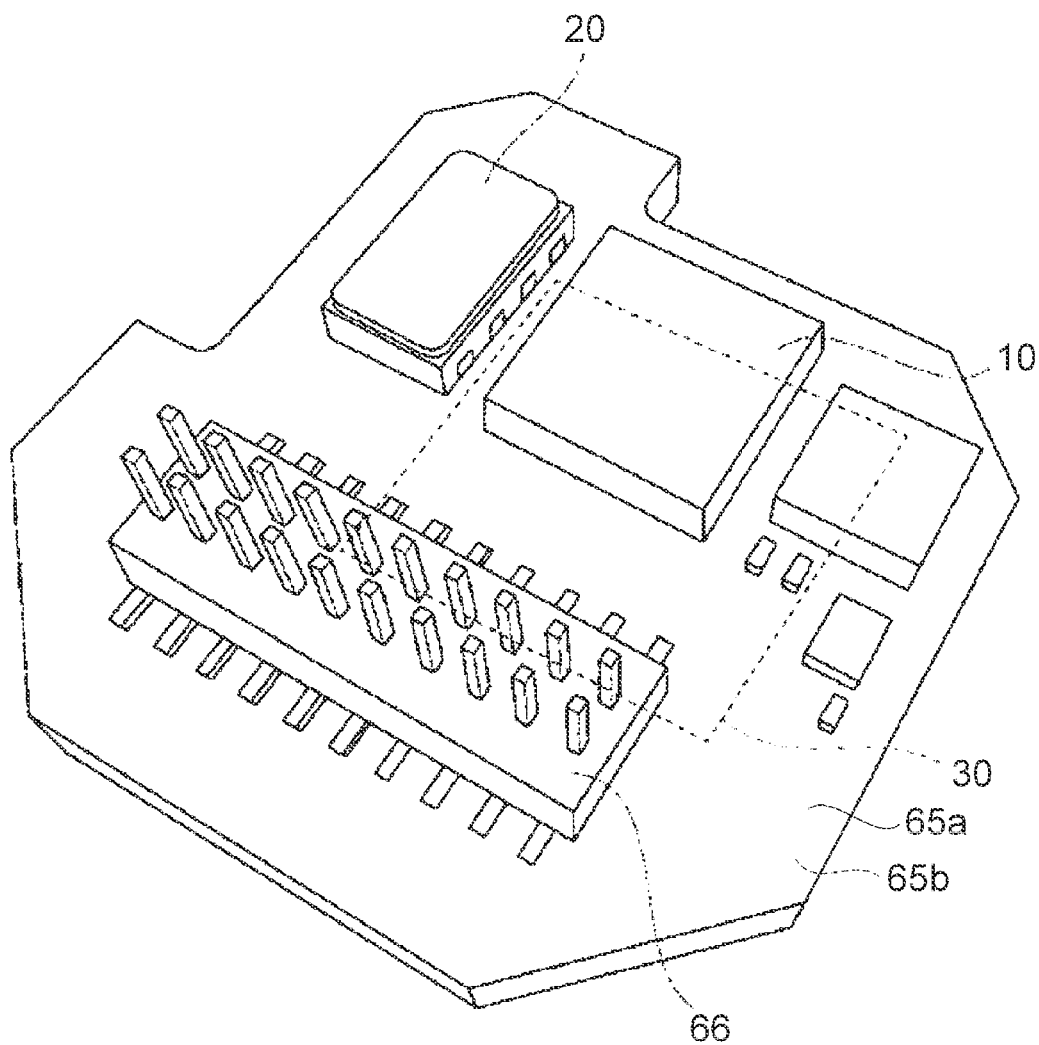
FIG. 4 is a perspective view of a circuit board.

FIG. 4 is a perspective view of the circuit board 65. The circuit board 65 is a multilayer board in which a plurality of through holes are formed, and a glass epoxy board is used as the circuit board 65. However, the circuit board 65 is not limited to the glass epoxy board, and may be a rigid board on which a plurality of inertial sensors, electronic components, connectors, and the like can be mounted. For example, a composite board or a ceramic board may be used. An outer shape of the circuit board 65 is a deformed octagonal shape in which a part thereof is cut in a plan view. A surface of the circuit board 65 on a Z(+) side is referred to as a first surface 65a, and an opposite-side surface from the first surface 65a is referred to as a second surface 65b.

As shown in FIG. 4, the connector 66, a first inertial sensor 10, a second inertial sensor 20, and the like are mounted on the first surface 65a of the circuit board 65. The connector 66 is a plug-type connector and includes two rows of coupling terminals in which a plurality of pins are disposed at equal pitches. The number of terminals may be appropriately changed according to design specifications.

The first inertial sensor 10 is a sensor having six detection axes, and is, for example, a 6DOF sensor that detects angular velocities around three axes of an X axis, a Y axis, and a Z axis and accelerations in three axis directions of the X axis, the Y axis, and the Z axis. The DOF is an abbreviation for degrees of freedom. For example, the first inertial sensor 10 is a capacitance type sensor obtained by processing a silicon substrate by a MEMS technology. The MEMS is an abbreviation for micro electro mechanical systems.

The second inertial sensor 20 is a sensor that detects an amount of inertia of one axis, and is, for example, a gyro sensor that detects an angular velocity around the Z-axis. For example, the second inertial sensor 20 is a vibration gyro sensor that includes a sensor element made of quartz crystal and detects an angular velocity based on a Coriolis force applied to an object to be vibrated. The second inertial sensor 20 may include a sensor element made of ceramic, silicon, or the like.

A processing device 30 is mounted on the second surface 65b of the circuit board 65. The processing device 30 may be mounted on the first surface 65a of the circuit board 65. The processing device 30 is, for example, a MCU, and is implemented as a one-chip IC. The MCU is an abbreviation for micro controller unit. The first inertial sensor 10 and the second inertial sensor 20 are coupled to the processing device 30 by wiring (not shown) provided on the circuit board 65. A plurality of electronic components such as a temperature sensor may be mounted on the circuit board 65.

1-2. Configuration of Inertial Measurement System

Figure 5:
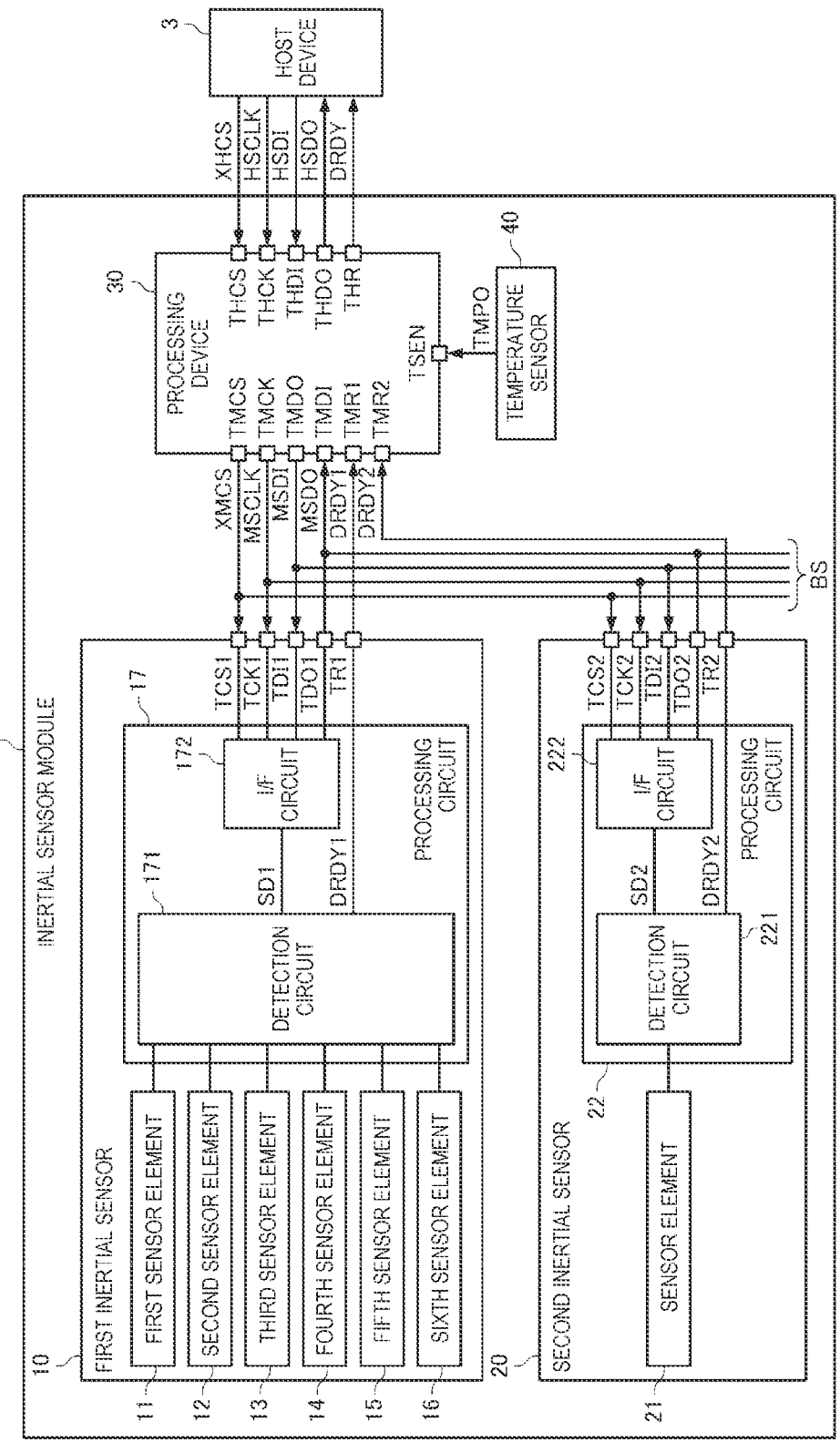
FIG. 5 is a diagram showing a configuration of an inertial measurement system according to the first embodiment.

Next, a configuration and functions of an inertial measurement system 1 according to the first embodiment using the inertial sensor module 2 will be described. A functional configuration of the inertial sensor module 2 will also be described. FIG. 5 is a diagram showing a configuration of the inertial measurement system 1 according to the first embodiment. As shown in FIG. 5, the inertial measurement system 1 according to the first embodiment includes the inertial sensor module 2 and a host device 3.

The inertial sensor module 2 includes the first inertial sensor 10, the second inertial sensor 20, the processing device 30, and a temperature sensor 40. In the inertial sensor module 2, a part of the components in FIG. 5 may be omitted or changed, and other components may be added.

The first inertial sensor 10 is a sensor having a first axis, a second axis, a third axis, a fourth axis, a fifth axis, and a sixth axis as detection axes, and includes a first sensor element 11, a second sensor element 12, a third sensor element 13, a fourth sensor element 14, a fifth sensor element 15, a sixth sensor element 16, and a processing circuit 17. For example, the first inertial sensor 10 may be a device in which a silicon substrate on which the first sensor element 11, the second sensor element 12, the third sensor element 13, the fourth sensor element 14, the fifth sensor element 15, the sixth sensor element 16, and the processing circuit 17 are formed is accommodated in a package, that is, a silicon MEMS sensor. Further, the first inertial sensor 10 includes a terminal TCS1, a terminal TCK1, a terminal TDI1, a terminal TDO1, and a terminal TR1 which are terminals for external coupling provided in the package.

The first sensor element 11 is a sensor element that detects a physical quantity with the first axis as the detection axis. The physical quantity is, for example, an angular velocity, an acceleration, an angular acceleration, a speed, a distance, a pressure, a sound pressure, or a magnetic quantity.

The second sensor element 12 is a sensor element that detects a physical quantity with the second axis different from the first axis as the detection axis. The third sensor element 13 is a sensor element that detects a physical quantity with the third axis different from the first axis and the second axis as the detection axis. The physical quantities detected by the first sensor element 11, the second sensor element 12, and the third sensor element 13 may be of the same type or different types from one another.

The fourth sensor element 14 is a sensor element that detects a physical quantity with the fourth axis as the detection axis. The fifth sensor element 15 is a sensor element that detects a physical quantity with the fifth axis different from the fourth axis as the detection axis. The sixth sensor element 16 is a sensor element that detects a physical quantity using the sixth axis different from the fourth axis and the fifth axis as the detection axis. The physical quantities detected by the fourth sensor element 14, the fifth sensor element 15, the sixth sensor element 16 may be of the same type or different types from one another. The fourth axis, the fifth axis and the sixth axis may be the same axis as the first axis, the second axis and the third axis, respectively, or may be different axes.

For example, the first axis and the fourth axis may both be the Z axis, the second axis and the fifth axis may both be the X axis, and the third axis and the sixth axis may both be the Y axis. The first sensor element 11 may detect the angular velocity around the Z axis. The second sensor element 12 may detect the angular velocity around the X axis. The third sensor element 13 may detect the angular velocity around the Y axis. The fourth sensor element 14 may detect the acceleration in a Z-axis direction. The fifth sensor element 15 may detect the acceleration in an X-axis direction. The sixth sensor element 16 may detect the acceleration in a Y-axis direction.

The processing circuit 17 performs a physical quantity detection process on signals output from the first sensor element 11, the second sensor element 12, the third sensor element 13, the fourth sensor element 14, the fifth sensor element 15, and the sixth sensor element 16, and outputs a first detection signal SD1 obtained by the detection process. The processing circuit 17 includes a detection circuit 171 that performs the physical quantity detection process on the signals output from the first sensor element 11, the second sensor element 12, the third sensor element 13, the fourth sensor element 14, the fifth sensor element 15, and the sixth sensor element 16, and an interface circuit 172 that outputs the first detection signal SD1 obtained by the detection process of the detection circuit 171.

The detection circuit 171 acquires the signals output from the first sensor element 11, the second sensor element 12, the third sensor element 13, the fourth sensor element 14, the fifth sensor element 15, and the sixth sensor element 16 at a predetermined cycle, and performs predetermined calculation to generate the first detection signal SD1. The first detection signal SD1 includes a first-axis detection signal obtained based on the output signal of the first sensor element 11, a second-axis detection signal obtained based on the output signal of the second sensor element 12, and a third-axis detection signal obtained based on the output signal of the third sensor element 13. Further, the first detection signal SD1 includes a fourth-axis detection signal obtained based on the output signal of the fourth sensor element 14, a fifth-axis detection signal obtained based on the output signal of the fifth sensor element 15, and a sixth-axis detection signal obtained based on the output signal of the sixth sensor element 16. The detection circuit 171 generates a first data ready signal DRDY1 for notifying completion of preparation of the first detection signal SD1 every time the generation of the first detection signal SD1 is completed. The first detection signal SD1 is output to the interface circuit 172, and the first data ready signal DRDY1 is output from the terminal TR1 and input to a terminal TMR1 of the processing device 30.

The interface circuit 172 acquires the first detection signal SD1 output from the detection circuit 171 in response to a read command received from the processing device 30, and outputs the acquired first detection signal SD1 to the processing device 30.

The second inertial sensor 20 is a sensor having the first axis as the detection axis, and includes a sensor element 21 and a processing circuit 22. For example, the second inertial sensor 20 may be a device in which a printed circuit board on which the sensor element 21 and the processing circuit 22 are mounted is accommodated in a package. The processing circuit 22 may be, for example, an IC chip implemented by a semiconductor. The IC is an abbreviation for integrated circuit. Further, the second inertial sensor 20 includes a terminal TCS2, a terminal TCK2, a terminal TDI2, a terminal TDO2, and a terminal TR2 which are terminals for external coupling provided in the package.

The sensor element 21 is a sensor element that detects a physical quantity with the same first axis as the detection axis of the first sensor element 11 included in the first inertial sensor 10 as the detection axis. The sensor element 21 may detect a type of physical quantity the same as the first sensor element 11. For example, both the sensor element 21 and the first sensor element 11 may detect the angular velocity around the Z axis.

The processing circuit 22 performs a physical quantity detection process on a signal output from the sensor element 21, and outputs a second detection signal SD2 obtained by the detection process. The processing circuit 22 includes a detection circuit 221 that performs the physical quantity detection process on the signal output from the sensor element 21, and an interface circuit 222 that outputs the second detection signal SD2 obtained by the detection process of the detection circuit 221.

The detection circuit 221 acquires a signal output from the sensor element 21 at a predetermined cycle and performs predetermined calculation to generate the second detection signal SD2. The second detection signal SD2 includes the first-axis detection signal obtained based on the output signal of the sensor element 21. The detection circuit 221 generates a second data ready signal DRDY2 for notifying completion of preparation of the second detection signal SD2 every time the generation of the second detection signal SD2 is completed. The second detection signal SD2 is output to the interface circuit 222, and the second data ready signal DRDY2 is output from the terminal TR2 and input to a terminal TMR2 of the processing device 30.

The interface circuit 222 acquires the second detection signal SD2 output from the detection circuit 221 in response to a read command received from the processing device 30, and outputs the acquired second detection signal SD2 to the processing device 30.

The inertial sensor module 2 includes digital interface buses BS that electrically couple the first inertial sensor 10 and the second inertial sensor 20 to the processing device 30.

The digital interface bus BS is a bus conforming to a communication standard of an interface process performed by the interface circuit 172 and the interface circuit 222. In the embodiment, the digital interface bus BS is a bus conforming to a SPI communication standard, and includes two data signal lines, a clock signal line, and a chip select signal line. The SPI is an abbreviation for a serial peripheral interface. Specifically, the first inertial sensor 10 is electrically coupled to the digital interface buses BS via the terminal TCS1, the terminal TCK1, the terminal TDI1, and the terminal TDO1. The second inertial sensor 20 is electrically coupled to the digital interface buses BS via the terminal TCS2, the terminal TCK2, the terminal TDI2, and the terminal TDO2. The processing device 30 is electrically coupled to the digital interface buses BS via a terminal TMCS, a terminal TMCK, a terminal TMDO, and a terminal TMDI. Here, the electrical coupling refers to coupling in which an electrical signal can be transmitted, and refers to coupling in which information can be transmitted by the electrical signal. However, the digital interface bus BS may be a bus conforming to an I2C communication standard, a communication standard developed from SPI or I2C, a communication standard obtained in which a part of the SPI or I2C standard is improved or modified, or the like. The I2C is an abbreviation for inter-integrated circuit.

The processing device 30 is a controller serving as a master for the first inertial sensor 10 and the second inertial sensor 20. The processing device 30 is an integrated circuit device, and is implemented by a processor such as a MPU. Alternatively, the processing device 30 may be implemented by an ASIC using automatic placement and routing such as a gate array.

The processing device 30 outputs a chip select signal XMCS from the terminal TMCS, outputs a serial clock signal MSCLK from the terminal TMCK, and outputs a serial data signal MSDI from the terminal TMDO. The interface circuit 172 performs an interface process of the SPI communication standard based on the chip select signal XMCS received from the terminal TCS1, the serial clock signal MSCLK received from the terminal TCK1, and the serial data signal MSDI received from the terminal TDI1. When the serial data signal MSDI is a read command of the first detection signal SD1, the interface circuit 172 outputs the first detection signal SD1 to the terminal TDO1. The interface circuit 222 performs an interface process of the SPI communication standard based on the chip select signal XMCS received from the terminal TCS2, the serial clock signal MSCLK received from the terminal TCK2, and the serial data signal MSDI received from the terminal TDI2. When the serial data signal MSDI is a read command of the second detection signal SD2, the interface circuit 222 outputs the second detection signal SD2 to the terminal TDO2. The first detection signal SD1 output from the terminal TDO1 of the first inertial sensor 10 and the second detection signal SD2 output from the terminal TDO2 of the second inertial sensor 20 are input to the terminal TMDI of the processing device 30 as a serial data signal MSDO.

The processing device 30 receives the first detection signal SD1 output from the first inertial sensor 10 and the second detection signal SD2 output from the second inertial sensor 20, and outputs measurement data based on the first detection signal SD1 and the second detection signal SD2 and based on output instruction information received from outside. Specifically, when the processing device 30 receives the first data ready signal DRDY1 from the terminal TMR1, the processing device 30 outputs a read command of the first detection signal SD1 to the first inertial sensor 10 to read the first detection signal SD1, and performs various calculation processes on the first detection signal SD1. When the processing device 30 receives the second data ready signal DRDY2 from the terminal TMR2, the processing device 30 outputs a read command of the second detection signal SD2 to the second inertial sensor 20 to read the second detection signal SD2, and performs various calculation processes on the second detection signal SD2.

For example, the processing device 30 may perform temperature correction calculation on the first detection signal SD1 and the second detection signal SD2 based on a temperature signal TMPO output from the temperature sensor 40 and received from a terminal TSEN. The temperature correction calculation is a calculation for correcting temperature dependence of the first detection signal SD1 and the second detection signal SD2 to be reduced by increasing or decreasing the first detection signal SD1 and the second detection signal SD2 according to a temperature in a predetermined temperature range. The temperature sensor 40 may be provided in the first inertial sensor 10 or the second inertial sensor 20.

The processing device 30 may perform sensitivity correction calculation, offset correction calculation, alignment correction calculation, and the like on the first detection signal SD1 and the second detection signal SD2. The sensitivity correction calculation is a calculation for correcting detection sensitivity of each axis to a reference value. The offset correction calculation is a calculation for correcting a zero point of each axis to a reference value. The alignment correction calculation is a calculation for correcting an error caused by a deviation between the detection axis of each sensor element and the X axis, the Y axis, or the Z axis of the inertial sensor module 2.

The processing device 30 may perform a calculation for calculating a posture, a speed, an angle, and the like of the inertial sensor module 2 based on the first detection signal SD1 and the second detection signal SD2.

When a cycle of performing the series of calculations is longer than a cycle of the first data ready signal DRDY1 or a cycle of the second data ready signal DRDY2, the processing device 30 may perform a down-sampling calculation of thinning out a part of the first detection signal SD1 and the second detection signal SD2.

In the embodiment, the processing device 30 is electrically coupled to the host device 3 via a terminal THCS, a terminal THCK, a terminal THDI, a terminal THDO, and a terminal THR. The host device 3 is a controller serving as a master for the processing device 30. Every time a series of calculations for the first detection signal SD1 and the second detection signal SD2 are completed, the processing device 30 outputs a data ready signal DRDY for notifying completion of preparation of measurement data from the terminal THR to the host device 3. Every time the data ready signal DRDY is received from the terminal THR, the host device 3 outputs a chip select signal XHCS, a serial clock signal HSCLK, and a serial data signal HSDI, which is a read command of measurement data as output instruction information, that conform to the SPI communication standard to the processing device 30. The processing device 30 performs the interface process of the SPI communication standard based on the chip select signal XHCS received from the terminal THCS, the serial clock signal HSCLK received from the terminal THCK, and the serial data signal HSDI received from the terminal THDI, and outputs the measurement data to the terminal THDO. The measurement data output from the terminal THDO of the processing device 30 is input to the host device 3 as a serial data signal HSDO. The processing device 30 may perform an interface process of, for example, an I2C communication standard, a communication standard developed from SPI or I2C, or a communication standard in which a part of the SPI or I2C standard is improved or modified.

In the embodiment, the processing device 30 outputs the measurement data in a format corresponding to output format selection information received from the outside.

Specifically, when the output format selection information is information of selecting a first format, the processing device 30 outputs the measurement data in the first format based on the output instruction information. The measurement data in the first format includes first-axis first measurement data based on the first-axis detection signal included in the first detection signal SD1, second-axis measurement data based on the second-axis detection signal included in the first detection signal SD1, third-axis measurement data based on the third-axis detection signal included in the first detection signal SD1, and first-axis second measurement data based on the first-axis detection signal included in the second detection signal SD2.

When the output format selection information is information of selecting a second format, the processing device 30 outputs the measurement data in the second format based on the output instruction information. The measurement data in the second format includes the first-axis second measurement data based on the first-axis detection signal included in the second detection signal SD2, the second-axis measurement data based on the second-axis detection signal included in the first detection signal SD1, and the third-axis measurement data based on the third-axis detection signal included in the first detection signal SD1.

When the output format selection information is information of selecting a third format, the processing device 30 outputs the measurement data in the third format based on the output instruction information. The measurement data in the third format includes the first-axis first measurement data based on the first-axis detection signal included in the first detection signal SD1, the second-axis measurement data based on the second-axis detection signal included in the first detection signal SD1, and the third-axis measurement data based on the third-axis detection signal included in the first detection signal SD1.

The host device 3 outputs, to the processing device 30, the chip select signal XHCS, the serial clock signal HSCLK, and the serial data signal HSDI which is a format selection command of measurement data as the output format selection information. The processing device 30 sets a format selected by the format selection command of measurement data in a format selection register (not shown) based on the chip select signal XHCS received from the terminal THCS, the serial clock signal HSCLK received from the terminal THCK, and the serial data signal HSDI received from the terminal THDI. When a read command of measurement data is received from the terminal THDI, the processing device 30 selects at least a part of various types of data obtained by a series of calculations with reference to the format selection register, and generates measurement data in a format set in the format selection register. Then, the processing device 30 outputs the generated measurement data from the terminal THDI.

When a timing or cycle at which the first data ready signal DRDY1 is output from the first inertial sensor 10 does not coincide with a timing or cycle at which the second data ready signal DRDY2 is output from the second inertial sensor 20, detection time points of the first detection signal SD1 and the second detection signal SD2 acquired by the processing device 30 do not coincide with each other. The processing device 30 calculates the first complementary data at a predetermined time point using the first detection signals SD1 at least at two time points. At least two time points are time points at which the first data ready signal DRDY1 is input at least twice most recently. The processing device 30 calculates second complementary data at the predetermined time point using the second detection signals SD2 at least at two time points. At least two time points are time points at which the second data ready signal DRDY2 is input at least twice most recently. For example, the processing device 30 may calculate the first complementary data at a predetermined time point through linear interpolation by approximating the first detection signals SD1 at two time points acquired most recently by a linear expression, and calculate the second complementary data at the predetermined time point through linear interpolation by approximating the second detection signals SD2 at two time points acquired most recently by a linear expression. Alternatively, the processing device 30 may calculate the first complementary data at a predetermined time point through nonlinear interpolation by approximating the first detection signals SD1 at three or more time points acquired most recently by a second-order or higher polynomial and calculate the second complementary data at the predetermined time point through nonlinear interpolation by approximating the second detection signals SD2 at three time points acquired most recently by a second-order or higher polynomial.

In this manner, the processing device 30 calculates the first complementary data and the second complementary data at the same time point, performs the above-described series of calculation processes on the first complementary data and the second complementary data, and outputs the data ready signal DRDY when the calculation process is completed. Then, the processing device 30 outputs the measurement data based on the first complementary data and the second complementary data in the format set in the format selection register based on the read command of the measurement data from the host device 3.

1-3. Configuration of Processing Device

Next, a specific configuration of the processing device 30 will be described. FIG. 6 is a diagram showing a configuration example of the processing device 30. As shown in FIG. 6, the processing device 30 includes a digital interface circuit 31, a processing circuit 32, and a host interface circuit 33.

The digital interface circuit 31 is a circuit that performs the interface process with the first inertial sensor 10 and the second inertial sensor 20. That is, the digital interface circuit 31 performs the interface process as a master between the interface circuit 172 and the interface circuit 222. The digital interface circuit 31 is coupled to the digital interface bus BS via the terminal TMCS, the terminal TMCK, the terminal TMDO, and the terminal TMDI. In the embodiment, the digital interface circuit 31 performs the interface process of the SPI communication standard, similarly to the interface circuit 172 and the interface circuit 222. The digital interface circuit 31 may perform the interface process of, for example, an I2C communication standard, a communication standard developed from SPI or I2C, or a communication standard in which a part of the SPI or I2C standard is improved or modified. The digital interface bus BS and the digital interface circuit 31 may be commonly provided in the first inertial sensor 10 and the second inertial sensor 20, or may be provided in each of the first inertial sensor 10 and the second inertial sensor 20.

The host interface circuit 33 is a circuit that performs the interface process with the host device 3. That is, the host interface circuit 33 performs the interface process as a slave with the host device 3. The host interface circuit 33 performs the interface process of the SPI communication standard on the host device 3 via the terminal THCS, the terminal THCK, the terminal THDO, and the terminal THDI. The host interface circuit 33 may perform the interface process of, for example, an I2C communication standard, a communication standard developed from SPI or I2C, or a communication standard in which a part of the SPI or I2C standard is improved or modified.

The processing circuit 32 performs a control process of the digital interface circuit 31 and the host interface circuit 33, various calculation processes, and the like. The processing circuit 32 includes a register unit 321, a detection signal acquisition circuit 322, a calculation circuit 323, and a measurement data generation circuit 324. The processing circuit 32 may perform the control process or the calculation process by executing a program stored in a storage unit (not shown).

The register unit 321 includes various registers such as the format selection register described above.

Every time the first data ready signal DRDY1 is received from the terminal TMR1, the detection signal acquisition circuit 322 outputs a read command of the first detection signal SD1 to the first inertial sensor 10 via the digital interface circuit 31, and acquires the first detection signal SD1 output from the first inertial sensor 10 via the digital interface circuit 31. Every time the second data ready signal DRDY2 is received from the terminal TMR2, the detection signal acquisition circuit 322 outputs a read command of the second detection signal SD2 to the second inertial sensor 20 via the digital interface circuit 31, and acquires the second detection signal SD2 output from the second inertial sensor 20 via the digital interface circuit 31.

The calculation circuit 323 performs various calculations on the first detection signal SD1 and the second detection signal SD2 acquired by the detection signal acquisition circuit 322. For example, the calculation circuit 323 performs the temperature correction calculation on the first-axis detection signal, the second-axis detection signal, the third-axis detection signal, the fourth-axis detection signal, the fifth-axis detection signal, and the sixth-axis detection signal included in the first detection signal SD1 based on the temperature signal TMPO received from the terminal TSEN. Similarly, the calculation circuit 323 performs the temperature correction calculation on the first-axis detection signal included in the second detection signal SD2 based on the temperature signal TMPO received from the terminal TSEN. The calculation circuit 323 performs the sensitivity correction calculation, the offset correction calculation, the alignment correction calculation, and the like on the first-axis detection signal, the second-axis detection signal, the third-axis detection signal, the fourth-axis detection signal, the fifth-axis detection signal, and the sixth-axis detection signal included in the first detection signal SD1. Similarly, the calculation circuit 323 performs the sensitivity correction calculation, the offset correction calculation, the alignment correction calculation, and the like on the first-axis detection signal included in the second detection signal SD2. The calculation circuit 323 may not perform a part of the temperature correction calculation, the sensitivity correction calculation, the offset correction calculation, and the alignment correction calculation, or may perform another correction calculation.

The calculation circuit 323 calculates, through the series of calculations, the first-axis first measurement data based on the first-axis detection signal included in the first detection signal SD1, the second-axis measurement data based on the second-axis detection signal included in the first detection signal SD1, the third-axis measurement data based on the third-axis detection signal included in the first detection signal SD1, fourth-axis measurement data based on the fourth-axis detection signal included in the first detection signal SD1, fifth-axis measurement data based on the fifth-axis detection signal included in the first detection signal SD1, sixth-axis measurement data based on the sixth-axis detection signal included in the first detection signal SD1, and the first-axis second measurement data based on the first-axis detection signal included in the second detection signal SD2.

When the cycle of performing the series of calculations is longer than the cycle of the first data ready signal DRDY1 or the cycle of the second data ready signal DRDY2, the calculation circuit 323 performs various calculation processes after performing the down-sampling calculation of thinning out a part of the first detection signal SD1 and the second detection signal SD2.

Further, the calculation circuit 323 may perform a calculation of calculating at least one of the posture, the speed, and the angle of the inertial sensor module 2 based on the first detection signal SD1 and the second detection signal SD2. The posture may be expressed by a roll, a pitch, or a yaw, or may be expressed by an Euler angle or a quaternion. For example, it is assumed that the first sensor element 11, the second sensor element 12, the third sensor element 13, and the sensor element 21 each detect an angular velocity, and the fourth sensor element 14, the fifth sensor element 15, and the sixth sensor element 16 each detect an acceleration. In this case, the calculation circuit 323 calculates the posture based on the first-axis first measurement data or the first-axis second measurement data, the second-axis measurement data, and the third-axis measurement data. The calculation circuit 323 integrates the fourth-axis measurement data, the fifth-axis measurement data, and the sixth-axis measurement data to calculate a speed in a fourth-axis direction, a speed in a fifth-axis direction, and a speed in a sixth-axis direction. The calculation circuit 323 integrates the first-axis first measurement data or the first-axis second measurement data, the second-axis measurement data, and the third-axis measurement data to calculate an angle around the first axis, an angle around the second axis, and an angle around the third axis.

When the series of calculations are completed, the calculation circuit 323 outputs the data ready signal DRDY to the host device 3 via the terminal THR.

When the detection time point of the first detection signal SD1 does not coincide with the detection time point of the second detection signal SD2, the calculation circuit 323 calculates the first complementary data at a predetermined time point using the first detection signals SD1 at least at two time points, and calculates the second complementary data at the predetermined time point using the second detection signals SD2 at least at two time points. The first complementary data includes complementary data of the first-axis detection signal, the second-axis detection signal, the third-axis detection signal, the fourth-axis detection signal, the fifth-axis detection signal, and the sixth-axis detection signal included in the first detection signal SD1. The second complementary data includes complementary data of the first-axis detection signal included in the second detection signal SD2. Then, the calculation circuit 323 performs the above-described series of calculation processes on the calculated first complementary data and second complementary data at the same time point to calculate the first-axis first measurement data, the second-axis measurement data, the third-axis measurement data, the fourth-axis measurement data, the fifth-axis measurement data, the sixth-axis measurement data, and the first-axis second measurement data.

The first-axis first measurement data, the second-axis measurement data, the third-axis measurement data, the fourth-axis measurement data, the fifth-axis measurement data, the sixth-axis measurement data, and the first-axis second measurement data are stored in different registers of the register unit 321. The data of the posture, the speed, and the angle of the inertial sensor module 2 is also stored in different registers of the register unit 321. The host device 3 can read the first-axis first measurement data, the second-axis measurement data, the third-axis measurement data, the fourth-axis measurement data, the fifth-axis measurement data, the sixth-axis measurement data, and the first-axis second measurement data by designating addresses different from each other, or can read measurement data in a format set in the format selection register.

When a read command of measurement data from the host device 3 is input via the host interface circuit 33, the measurement data generation circuit 324 refers to the format selection register included in the register unit 321 and generates measurement data in a format corresponding to a set value of the format selection register. Then, the measurement data generation circuit 324 outputs the generated measurement data to the host device 3 via the host interface circuit 33.

FIG. 7 is a diagram showing an example of a format of selectable measurement data in the first embodiment.

In the first embodiment, when the first format is set in the format selection register, the measurement data generation circuit 324 outputs the measurement data in the first format when the read command of the measurement data is input. As shown in FIG. 7, the measurement data in the first format includes first-axis first measurement data $G_{Z1}$ based on the first-axis detection signal included in the first detection signal SD1, second-axis measurement data $G_{X1}$ based on the second-axis detection signal included in the first detection signal SD1, third-axis measurement data $G_{Y1}$ based on the third-axis detection signal included in the first detection signal SD1, and first-axis second measurement data $G_{Z2}$ based on the first-axis detection signal included in the second detection signal SD2. Further, in the example in FIG. 7, the measurement data in the first format includes fourth-axis measurement data $A_{Z1}$ based on the fourth-axis detection signal included in the first detection signal SD1, fifth-axis measurement data $A_{X1}$ based on the fifth-axis detection signal included in the first detection signal SD1, and sixth-axis measurement data $A_{Y1}$ based on the sixth-axis detection signal included in the first detection signal SD1.

In the first embodiment, when the second format is set in the format selection register, the measurement data generation circuit 324 outputs the measurement data in the second format when the read command of the measurement data is input. As shown in FIG. 7, the measurement data in the second format includes the first-axis second measurement data $G_{Z2}$ based on the first-axis detection signal included in the second detection signal SD2, the second-axis measurement data $G_{X1}$ based on the second-axis detection signal included in the first detection signal SD1, and the third-axis measurement data $G_{Y1}$ based on the third-axis detection signal included in the first detection signal SD1. Further, in the example in FIG. 7, the measurement data in the second format includes the fourth-axis measurement data $A_{Z1}$ based on the fourth-axis detection signal included in the first detection signal SD1, the fifth-axis measurement data $A_{X1}$ based on the fifth-axis detection signal included in the first detection signal SD1, the sixth-axis measurement data $A_{Y1}$ based on the sixth-axis detection signal included in the first detection signal SD1, and temperature data TP based on the temperature signal TMPO.

In the first embodiment, when the third format is set in the format selection register, the measurement data generation circuit 324 outputs the measurement data in the third format when the read command of the measurement data is input. As shown in FIG. 7, the measurement data in the third format includes the first-axis first measurement data $G_{Z1}$ based on the first-axis detection signal included in the first detection signal SD1, the second-axis measurement data $G_{X1}$ based on the second-axis detection signal included in the first detection signal SD1, and the third-axis measurement data $G_{Y1}$ based on the third-axis detection signal included in the first detection signal SD1. Further, in the example in FIG. 7, the measurement data in the third format includes the fourth-axis measurement data $A_{Z1}$ based on the fourth-axis detection signal included in the first detection signal SD1, the fifth-axis measurement data $A_{X1}$ based on the fifth-axis detection signal included in the first detection signal SD1, the sixth-axis measurement data $A_{Y1}$ based on the sixth-axis detection signal included in the first detection signal SD1, and the temperature data TP based on the temperature signal TMPO.

In the example of FIG. 7, the first-axis first measurement data $G_{Z1}$ and the first-axis second measurement data $G_{Z2}$ are both Z-axis angular velocity data. The second-axis measurement data $G_{X1}$ is X-axis angular velocity data. The third-axis measurement data $G_{Y1}$ is Y-axis angular velocity data. The fourth-axis measurement data $A_{Z1}$ is Z-axis acceleration data. The fifth-axis measurement data $A_{X1}$ is X-axis acceleration data. The sixth-axis measurement data $A_{Y1}$ is Y-axis acceleration data.

Here, in the measurement data in the first format, the first data is the second-axis measurement data $G_{X1}$, the second data is the third-axis measurement data $G_{Y1}$, and the third data is the first-axis second measurement data $G_{Z2}$. In the measurement data in the second format, the first data is the second-axis measurement data $G_{X1}$, the second data is the third-axis measurement data $G_{Y1}$, and the third data is the first-axis second measurement data $G_{Z2}$. In the measurement data in the third format, the first data is the second-axis measurement data $G_{X1}$, the second data is the third-axis measurement data $G_{Y1}$, and the third data is the first-axis first measurement data $G_{Z1}$. That is, the arrangement of the second-axis measurement data $G_{X1}$ included in the measurement data in the first format, the second-axis measurement data $G_{X1}$ included in the measurement data in the second format, and the second-axis measurement data $G_{X1}$ included in the measurement data in the third format are the same. The arrangement of the third-axis measurement data $G_{Y1}$ included in the measurement data in the first format, the third-axis measurement data $G_{Y1}$ included in the measurement data in the second format, and the third-axis measurement data $G_{Y1}$ included in the measurement data in the third format are the same. The arrangement of the first-axis second measurement data $G_{Z2}$ included in the measurement data in the first format, the first-axis second measurement data $G_{Z2}$ included in the measurement data in the second format, and the first-axis first measurement data $G_{Z1}$ included in the measurement data in the third format are the same. In other words, in any of the measurement data in the first format, the measurement data in the second format, and the measurement data in the third format, the first data is the measurement data of the second axis, the second data is the measurement data of the third axis, and the third data is the measurement data of the first axis. Therefore, even when any of the measurement data in the first format, the measurement data in the second format, and the measurement data in the third format is output, the host device 3 can perform the calculation using the measurement data of the first axis, the measurement data of the second axis, and the measurement data of the third axis in the same manner.

Similarly, in any of the measurement data in the first format, the measurement data in the second format, and the measurement data in the third format, the fourth data is the fifth-axis measurement data $A_{X1}$, the fifth data is the sixth-axis measurement data $A_{Y1}$, and the sixth data is the fourth-axis measurement data $A_{Z1}$. Therefore, even when any of the measurement data in the first format, the measurement data in the second format, and the measurement data in the third format is output, the host device 3 can perform the calculation using the fourth-axis measurement data $A_{Z1}$, the fifth-axis measurement data $A_{X1}$, and the sixth-axis measurement data $A_{Y1}$ in the same manner.

Next, in the example in FIG. 7, a specific example in which the host device 3 switches the format of the measurement data to be output to the inertial sensor module 2 will be described.

Detection accuracy of the second inertial sensor 20 is higher than detection accuracy of the first inertial sensor 10. For example, the sensor element 21 included in the second inertial sensor 20 is an element made of quartz crystal. In contrast, the first sensor element 11, the second sensor element 12, and the third sensor element 13 included in the first inertial sensor 10 are elements made of a silicon substrate using a MEMS technology. The second inertial sensor 20 including the sensor element 21 has high frequency temperature characteristics, high frequency stability, and low noise and jitter. Therefore, compared with the first inertial sensor 10 including the first sensor element 11, the second sensor element 12, and the third sensor element 13, the second inertial sensor 20 is expensive but has higher detection accuracy. Therefore, when high accuracy is required for the detection of the physical quantity of the first axis, the first-axis second measurement data $G_{Z2}$ is basically used as the measurement data of the first axis.

On the other hand, due to the difference in material and structure between the sensor element 21 and the first sensor element 11, for a data range in which linearity of the output with respect to the input is satisfied, the first-axis first measurement data $G_{Z1}$ may be wider than the first-axis second measurement data $G_{Z2}$. Therefore, in a first input range in which the linearity of the first-axis second measurement data $G_{Z2}$ is satisfied, the accuracy of the first-axis second measurement data $G_{Z2}$ is higher than that of the first-axis first measurement data $G_{Z1}$, and in a second input range in which the linearity of the first-axis second measurement data $G_{Z2}$ is not satisfied, the accuracy of the first-axis first measurement data $G_{Z1}$ may be higher than that of the first-axis second measurement data $G_{Z2}$.

In such a case, when the host device 3 causes the inertial sensor module 2 to output the measurement data in the first format, the host device 3 performs a calculation using the first-axis second measurement data $G_{Z2}$, the second-axis measurement data $G_{X1}$, and the third-axis measurement data $G_{Y1}$, and determines whether the physical quantity applied to the first axis is included in both the first input range and the second input range based on the value of the first-axis first measurement data $G_{Z1}$. When the physical quantity applied to the first axis is included in the first input range, the host device 3 does not change a set value of the format selection register in the first format. When the physical quantity applied to the first axis is included in the second input range, the host device 3 changes the set value of the format selection register to the third format. When the measurement data in the third format is output to the inertial sensor module 2, the host device 3 performs the calculation using the first-axis first measurement data $G_{Z1}$, the second-axis measurement data $G_{X1}$, and the third-axis measurement data $G_{Y1}$, and determines whether the physical quantity applied to the first axis is included in both the first input range and the second input range based on the value of the first-axis first measurement data $G_{Z1}$. When the physical quantity applied to the first axis is included in the second input range, the host device 3 does not change a set value of the format selection register in the third format. When the physical quantity applied to the first axis is included in the first input range, the host device 3 changes the set value of the format selection register to the first format. In this way, the host device 3 can more accurately determine whether the physical quantity applied to the first axis is included in the first input range or the second input range based on the value of the first-axis first measurement data $G_{Z1}$ having a wider range satisfying the linearity, and switch the first format and the third format, so that the accuracy of the calculation can be increased regardless of the range of the physical quantity applied to the first axis.

In the example of FIG. 7, another specific example in which the host device 3 switches the format of the measurement data to be output to the inertial sensor module 2 will be described.

When the temperature is in a first temperature range, the first-axis second measurement data $G_{Z2}$ is higher in accuracy than the first-axis first measurement data $G_{Z1}$. When the temperature is in a second temperature range other than the first temperature range, the first-axis first measurement data $G_{Z1}$ may be higher in accuracy than the first-axis second measurement data $G_{Z2}$. In such a case, when the host device 3 causes the inertial sensor module 2 to output the measurement data in the second format, the host device 3 performs the calculation using the first-axis second measurement data $G_{Z2}$, the second-axis measurement data $G_{X1}$, and the third-axis measurement data $G_{Y1}$, and determines whether the temperature is included in the first temperature range or the second temperature range based on the value of the temperature data TP. Then, when the temperature is included in the first temperature range, the host device 3 does not change the set value of the format selection register in the second format. When the temperature is included in the second temperature range, the host device 3 changes the set value of the format selection register to the third format. When the host device 3 causes the inertial sensor module 2 to output the measurement data in the third format, the host device 3 performs the calculation using the first-axis first measurement data $G_{Z1}$, the second-axis measurement data $G_{X1}$, and the third-axis measurement data $G_{Y1}$, and determines whether the temperature is included in the first temperature range or the second temperature range based on the value of the temperature data TP. Then, when the temperature is included in the second temperature range, the host device 3 does not change the set value of the format selection register in the third format. When the temperature is included in the first temperature range, the host device 3 changes the set value of the format selection register to the second format. As described above, the host device 3 determines whether the temperature is included in the first temperature range or the second temperature range based on the value of the temperature data TP, and switches the second format and the third format, so that the accuracy of calculation can be improved regardless of the temperature range.

1-4. Functions and Effects

As described above, according to the inertial measurement system 1 according to the first embodiment, since the format of the measurement data output from the inertial sensor module 2 based on the output instruction information received from the host device 3 is selected according to the output format selection information received from the host device 3, the format of the measurement data can be changed from the host device 3.

According to the inertial measurement system 1 according to the first embodiment, the host device 3 can output the measurement data in the first format from the inertial sensor module 2 and perform the calculation based on the first-axis second measurement data, the second-axis measurement data, and the third-axis measurement data.

According to the inertial measurement system 1 according to the first embodiment, the host device 3 can output the measurement data in the second format from the inertial sensor module 2 to perform the calculation based on the first-axis second measurement data, the second-axis measurement data, and the third-axis measurement data, or can output the measurement data in the third format from the inertial sensor module 2 to perform the calculation based on the first-axis first measurement data, the second-axis measurement data, and the third-axis measurement data.

According to the inertial measurement system 1 according to the first embodiment, the arrangement of the measurement data of the first axis, the measurement data of the second axis, and the measurement data of the third axis is the same in any of the measurement data in the first format, the measurement data in the second format, and the measurement data in the third format output from the inertial sensor module 2. Therefore, even when any of the measurement data in the first format, the measurement data in the second format, and the measurement data in the third format is output, the host device 3 can perform the calculation using the measurement data of the first axis, the measurement data of the second axis, and the measurement data of the third axis in the same manner.

According to the inertial measurement system 1 according to the first embodiment, the inertial sensor module 2 can output the measurement data including the first complementary data and the second complementary data at the same time point even when a detection timing and a detection cycle are different between the first inertial sensor 10 and the second inertial sensor 20. Therefore, the host device 3 can perform a correct calculation based on the first complementary data and the second complementary data.

2. Second Embodiment

Hereinafter, in an inertial measurement system according to a second embodiment, the same components as those in the first embodiment are denoted by the same reference numerals, the description overlapping with the first embodiment is omitted or simplified, and contents different from those in the first embodiment will be mainly described.

The structure of the inertial sensor module 2 in the second embodiment is the same as that in FIGS. 1 to 4, and thus the illustration thereof is omitted. The functional configuration of the inertial sensor module 2 in the second embodiment is the same as that in FIG. 5, and thus the illustration thereof is omitted. The functional configuration of the processing device 30 according to the second embodiment is the same as that in FIG. 6, and thus the illustration thereof is omitted. In the inertial measurement system 1 according to the second embodiment, a fourth format is added as a selectable format of the measurement data output from the processing device 30 of the inertial sensor module 2.

Similarly to the first embodiment, the processing device 30 according to the second embodiment calculates first-axis first measurement data obtained by correcting the first-axis detection signal included in the first detection signal SD1, second-axis measurement data obtained by correcting the second-axis detection signal included in the first detection signal SD1, third-axis measurement data obtained by correcting the third-axis detection signal included in the first detection signal SD1, and first-axis second measurement data obtained by correcting the first-axis detection signal included in the second detection signal SD2. Similarly, the processing device 30 calculates fourth-axis measurement data obtained by correcting the fourth-axis detection signal included in the first detection signal SD1, fifth-axis measurement data obtained by correcting the fifth-axis detection signal included in the first detection signal SD1, and sixth-axis measurement data obtained by correcting the sixth-axis detection signal included in the first detection signal SD1.

When the output format selection information is information of selecting the fourth format, the processing device 30 outputs the measurement data in the fourth format based on the output instruction information. That is, when the fourth format is set in the format selection register and a read command of the measurement data from the host device 3 is input via the host interface circuit 33, the measurement data generation circuit 324 included in the processing device 30 generates the measurement data in the fourth format and outputs the generated measurement data to the host device 3 via the host interface circuit 33.

FIG. 8 is a diagram showing an example of a format of selectable measurement data in the second embodiment.

In the second embodiment, when the first format is set in the format selection register, the measurement data generation circuit 324 outputs the measurement data in the first format when the read command of the measurement data is input. When the second format is set in the format selection register, the measurement data generation circuit 324 outputs the measurement data in the second format when the read command of the measurement data is input. When the third format is set in the format selection register, the measurement data generation circuit 324 outputs the measurement data in the third format when the read command of the measurement data is input. As shown in FIG. 8, the measurement data in the first format, the measurement data in the second format, and the measurement data in the third format are the same as those in FIG. 7, and thus description thereof will be omitted.

Further, in the second embodiment, when the fourth format is set in the format selection register, the measurement data generation circuit 324 outputs the measurement data in the fourth format when the read command of the measurement data is input. In the example of FIG. 8, the measurement data in the fourth format includes the first-axis first measurement data $G_{Z1}$, the second-axis measurement data $G_{X1}$, the third-axis measurement data $G_{Y1}$, the first-axis second measurement data $G_{Z2}$, first-axis first detection data $G_{Z1}'$ which is the first-axis detection signal included in the first detection signal SD1, second-axis detection data $G_{X1}'$ which is the second-axis detection signal included in the first detection signal SD1, third-axis detection data $G_{Y1}'$ which is the third-axis detection signal included in the first detection signal SD1, and first-axis second detection data $G_{Z2}'$ which is the first-axis detection signal included in the second detection signal SD2. Further, in the example of FIG. 8, the measurement data in the fourth format includes the fourth-axis measurement data $A_{Z1}$, the fifth-axis measurement data $A_{X1}$, the sixth-axis measurement data $A_{Y1}$, fourth-axis detection data $A_{Z1}'$ which is the fourth-axis detection signal included in the first detection signal SD1, fifth-axis detection data $A_{X1}'$ which is the fifth-axis detection signal included in the first detection signal SD1, and sixth-axis detection data $A_{Y1}'$ which is the sixth-axis detection signal included in the first detection signal SD1.

In the example of FIG. 8, the first-axis first measurement data $G_{Z1}$, the first-axis second measurement data $G_{Z2}$, the first-axis first detection data $G_{Z1}'$, and the first-axis second detection data $G_{Z2}'$ are all Z-axis angular velocity data. The second-axis measurement data $G_{X1}$ and the second-axis detection data $G_{X1}'$ are the X-axis angular velocity data. The third-axis measurement data $G_{Y1}$ and the third-axis detection data $G_{Y1}'$ are the Y-axis angular velocity data. The fourth-axis measurement data $A_{Z1}$ and the fourth-axis detection data $A_{Z1}'$ are the Z-axis acceleration data. The fifth-axis measurement data $A_{X1}$ and the fifth-axis detection data $A_{X1}'$ are the X-axis acceleration data. The sixth-axis measurement data $A_{Y1}$ and the sixth-axis detection data $A_{Y1}'$ are the Y-axis acceleration data.

Here, in any of the measurement data in the first format to the fourth format, the first data is the measurement data of the second axis, the second data is the measurement data of the third axis, and the third data is the measurement data of the first axis. Therefore, even when any of the measurement data in the first format to the fourth format is output, the host device 3 can perform the calculation using the measurement data of the first axis, the measurement data of the second axis, and the measurement data of the third axis in the same manner. Similarly, in any of the measurement data in the first format to the fourth format, the fourth data is the fifth-axis measurement data $A_{X1}$, the fifth data is the sixth-axis measurement data $A_{Y1}$, and the sixth data is the fourth-axis measurement data $A_{Z1}$. Therefore, even when any of the measurement data in the first format to the fourth format is output, the host device 3 can perform the calculation using the fourth-axis measurement data $A_{Z1}$, the fifth-axis measurement data $A_{X1}$, and the sixth-axis measurement data $A_{Y1}$ in the same manner.

For example, the host device 3 periodically outputs the measurement data in the fourth format to the inertial sensor module 2. By comparing the first-axis first measurement data $G_{Z1}$, the second-axis measurement data $G_{X1}$, the third-axis measurement data $G_{Y1}$, and the first-axis second measurement data $G_{Z2}$ with the first-axis first detection data $G_{Z1}'$, the second-axis detection data $G_{X1}'$, the third-axis detection data $G_{Y1}'$, and the first-axis second detection data $G_{Z2}'$, respectively, it is possible to determine whether each of the first-axis first measurement data $G_{Z1}$, the second-axis measurement data $G_{X1}$, the third-axis measurement data $G_{Y1}$, and the first-axis second measurement data $G_{Z2}$ is normal. Similarly, by comparing the fourth-axis measurement data $A_{Z1}$, the fifth-axis measurement data $A_{X1}$, and the sixth-axis measurement data $A_{Y1}$ with the fourth-axis detection data $A_{Z1}'$, the fifth-axis detection data $A_{X1}'$, and the sixth-axis detection data $A_{Y1}'$, respectively, the host device 3 can determine whether each of the fourth-axis measurement data $A_{Z1}$, the fifth-axis measurement data $A_{X1}$, and the sixth-axis measurement data $A_{Y1}$ is normal.

Since other configurations and functions of the inertial measurement system 1 according to the second embodiment are the same as those of the first embodiment, the description thereof will be omitted.

The inertial measurement system 1 according to the second embodiment described above has the same effect as the inertial measurement system 1 according to the first embodiment.

Further, in the inertial measurement system 1 according to the second embodiment, the inertial sensor module 2 can output the measurement data including the first-axis first detection data, the first-axis first measurement data obtained by correcting the first-axis first detection data, the second-axis detection data, the second-axis measurement data obtained by correcting the second-axis detection data, the third-axis detection data, the third-axis measurement data obtained by correcting the third-axis detection data, the first-axis second detection data, and the first-axis second measurement data obtained by correcting the first-axis second detection data. Therefore, for example, by comparing the first-axis first measurement data, the second-axis measurement data, the third-axis measurement data, and the first-axis second measurement data with the first-axis first detection data, the second-axis detection data, the third-axis detection data, and the first-axis second detection data, respectively, the host device 3 can determine whether a correction process executed by the processing device 30 is normal or evaluate a degree of the correction process, and the like.

3. Third Embodiment

Hereinafter, in an inertial measurement system according to a third embodiment, the same components as those in the first embodiment or the second embodiment are denoted by the same reference numerals, repetitive description as that in the first embodiment or the second embodiment is omitted or simplified, and contents different from those in the first embodiment or the second embodiment will be mainly described.

The structure of the inertial sensor module 2 in the third embodiment is the same as that in FIGS. 1 to 4, and thus the illustration thereof is omitted. The functional configuration of the inertial sensor module 2 in the third embodiment is the same as that in FIG. 5, and thus the illustration thereof is omitted. The functional configuration of the processing device 30 according to the third embodiment is the same as that in FIG. 6, and thus the illustration thereof is omitted. In the inertial measurement system 1 according to the third embodiment, a fifth format and a sixth format are added as selectable formats of the measurement data output from the processing device 30 of the inertial sensor module 2.

Similarly to the first and second embodiments, the processing device 30 according to the third embodiment calculates first-axis first measurement data obtained by correcting the first-axis detection signal included in the first detection signal SD1, second-axis measurement data obtained by correcting the second-axis detection signal included in the first detection signal SD1, third-axis measurement data obtained by correcting the third-axis detection signal included in the first detection signal SD1, and first-axis second measurement data obtained by correcting the first-axis detection signal included in the second detection signal SD2. Similarly, the processing device 30 calculates fourth-axis measurement data obtained by correcting the fourth-axis detection signal included in the first detection signal SD1, fifth-axis measurement data obtained by correcting the fifth-axis detection signal included in the first detection signal SD1, and sixth-axis measurement data obtained by correcting the sixth-axis detection signal included in the first detection signal SD1.

Further, when the output format selection information is information for selecting the fifth format, the processing device 30 according to the third embodiment calculates first inertia data including at least one of the posture, the speed, and the angle of the inertial sensor module 2 based on the first-axis detection signal included in the second detection signal SD2, the second-axis detection signal included in the first detection signal SD1, and the third-axis detection signal included in the first detection signal SD1, and outputs the measurement data in the fifth format including the first inertia data based on the output instruction information. The processing device 30 may calculate the first inertia data further based on the fourth-axis detection signal included in the first detection signal SD1, the fifth-axis detection signal included in the first detection signal SD1, and the sixth-axis detection signal included in the first detection signal SD1.

When the output format selection information is information for selecting the sixth format, the processing device 30 according to the third embodiment calculates second inertia data including at least one of the posture, the speed, and the angle of the inertial sensor module 2 based on the first-axis detection signal included in the first detection signal SD1, the second-axis detection signal included in the first detection signal SD1, and the third-axis detection signal included in the first detection signal SD1, and outputs the measurement data in the sixth format including the second inertia data based on the output instruction information. The processing device 30 may calculate the second inertia data further based on the fourth-axis detection signal included in the first detection signal SD1, the fifth-axis detection signal included in the first detection signal SD1, and the sixth-axis detection signal included in the first detection signal SD1.

For example, when the fifth format is set in the format selection register, the measurement data generation circuit 324 included in the processing device 30 generates the first inertia data based on the first-axis second measurement data, the second-axis measurement data, the third-axis measurement data, the fourth-axis measurement data, the fifth-axis measurement data, and the sixth-axis measurement data. When the read command of the measurement data from the host device 3 is input via the host interface circuit 33, the measurement data generation circuit 324 generates the measurement data in the fifth format including the first inertia data, and outputs the generated measurement data to the host device 3 via the host interface circuit 33. When the sixth format is set in the format selection register, the measurement data generation circuit 324 generates the second inertia data based on the first-axis first measurement data, the second-axis measurement data, the third-axis measurement data, the fourth-axis measurement data, the fifth-axis measurement data, and the sixth-axis measurement data. Further, when the read command of the measurement data from the host device 3 is input via the host interface circuit 33, the measurement data generation circuit 324 generates the measurement data in the sixth format including the second inertia data, and outputs the generated measurement data to the host device 3 via the host interface circuit 33.

FIG. 9 is a diagram showing an example of a format of selectable measurement data in the third embodiment.

In the third embodiment, when the first format is set in the format selection register, the measurement data generation circuit 324 outputs the measurement data in the first format when the read command of the measurement data is input. When the second format is set in the format selection register, the measurement data generation circuit 324 outputs the measurement data in the second format when the read command of the measurement data is input. When the third format is set in the format selection register, the measurement data generation circuit 324 outputs the measurement data in the third format when the read command of the measurement data is input. When the fourth format is set in the format selection register, the measurement data generation circuit 324 outputs the measurement data in the fourth format when the read command of the measurement data is input. As shown in FIG. 9, the measurement data in the first format, the measurement data in the second format, the measurement data in the third format, and the measurement data in the fourth format are the same as those in FIG. 8, and thus description thereof will be omitted.

Further, in the third embodiment, when the fifth format is set in the format selection register, the measurement data generation circuit 324 outputs the measurement data in the fifth format when the read command of the measurement data is input. In the example of FIG. 9, the measurement data in the fifth format includes the first-axis second measurement data $G_{Z2}$, the second-axis measurement data $G_{X1}$, the third-axis measurement data $G_{Y1}$, the fourth-axis measurement data $A_{Z1}$, the fifth-axis measurement data $A_{X1}$, the sixth-axis measurement data $A_{Y1}$, and the temperature data TP. Further, in the example of FIG. 9, the measurement data in the fifth format includes, as the first inertial data, roll angle data $R_1$, pitch angle data $P_1$ and second yaw angle data $Y_2$ indicating the posture of the inertial sensor module 2, and first-axis second angle data $\theta_{Z2}$, second-axis angle data $\theta_{X1}$, and third-axis angle data $\theta_{Y1}$ indicating the angle of the inertia sensor module 2. The roll angle data $R_1$, the pitch angle data $P_1$, and the second yaw angle data $Y_2$ are posture data calculated based on the first-axis second measurement data $G_{Z2}$, the second-axis measurement data $G_{X1}$, and the third-axis measurement data $G_{Y1}$n. The first-axis second angle data $\theta_{Z2}$, the second-axis angle data $\theta_{X1}$, and the third-axis angle data $\theta_{Y1}$ are angle data obtained by integrating the first-axis second measurement data $G_{Z2}$, the second-axis measurement data $G_{X1}$, and the third-axis measurement data $G_{Y1}$, respectively.

When the sixth format is set in the format selection register, the measurement data generation circuit 324 outputs the measurement data in the sixth format when the read command of the measurement data is input. In the example of FIG. 9, the measurement data in the sixth format includes the first-axis first measurement data $G_{Z1}$, the second-axis measurement data $G_{X1}$, the third-axis measurement data $G_{Y1}$, the fourth-axis measurement data $A_{Z1}$, the fifth-axis measurement data $A_{X1}$, the sixth-axis measurement data $A_{Y1}$, and the temperature data TP. Further, in the example of FIG. 9, the measurement data in the sixth format includes, as the second inertia data, the roll angle data $R_1$, the pitch angle data $P_1$ and first yaw angle data $Y_1$ indicating the posture of the inertial sensor module 2, and first-axis first angle data $\theta_{Z1}$, the second-axis angle data $\theta_{X1}$, and the third-axis angle data $\theta_{Y1}$ indicating the angle of the inertia sensor module 2. The roll angle data $R_1$, the pitch angle data $P_1$, and the first yaw angle data $Y_1$ are posture data calculated based on the first-axis first measurement data $G_{Z1}$, the second-axis measurement data $G_{X1}$, and the third-axis measurement data $G_{Y1}$. The first-axis first angle data $\theta_{Z1}$, the second-axis angle data $\theta_{X1}$, and the third-axis angle data $\theta_{Y1}$ are angle data obtained by integrating the first-axis first measurement data $G_{Z1}$, the second-axis measurement data $G_{X1}$, and the third-axis measurement data $G_{Y1}$, respectively.

In the example of FIG. 9, the first-axis first measurement data $G_{Z1}$, the first-axis second measurement data $G_{Z2}$, the first-axis first detection data $G_{Z1}'$, and the first-axis second detection data $G_{Z2}'$ are all Z-axis angular velocity data. The second-axis measurement data $G_{X1}$ and the second-axis detection data $G_{X1}'$ are the X-axis angular velocity data. The third-axis measurement data $G_{Y1}$ and the third-axis detection data $G_{Y1}'$ are the Y-axis angular velocity data. The fourth-axis measurement data $A_{Z1}$ and the fourth-axis detection data $A_{Z1}'$ are the Z-axis acceleration data. The fifth-axis measurement data $A_{X1}$ and the fifth-axis detection data $A_{X1}'$ are the X-axis acceleration data. The sixth-axis measurement data $A_{Y1}$ and the sixth-axis detection data $A_{Y1}'$ are the Y-axis acceleration data.

In the example in FIG. 9, the measurement data in the fifth format and the measurement data in the sixth format include the posture data and the angle data, and may also include speed data in addition to the posture data and the angle data or in place of at least one of the posture data and the angle data. The speed data may include fourth-axis speed data, fifth-axis speed data, and sixth-axis speed data obtained by integrating the fourth-axis measurement data $A_{Z1}$, the fifth-axis measurement data $A_{X1}$, and the sixth-axis measurement data $A_{Y1}$, respectively.

Here, in any of the measurement data in the first format to the sixth format, the first data is the measurement data of the second axis, the second data is the measurement data of the third axis, and the third data is the measurement data of the first axis. Therefore, even when any of the measurement data in the first format to the sixth format is output, the host device 3 can perform the calculation using the measurement data of the first axis, the measurement data of the second axis, and the measurement data of the third axis in the same manner. Similarly, in any of the measurement data in the first format to the sixth format, the fourth data is the fifth-axis measurement data $A_{X1}$, the fifth data is the sixth-axis measurement data $A_{Y1}$, and the sixth data is the fourth-axis measurement data $A_{Z1}$. Therefore, even when any of the measurement data in the first format to the sixth format is output, the host device 3 can perform the calculation using the fourth-axis measurement data $A_{Z1}$, the fifth-axis measurement data $A_{X1}$, and the sixth-axis measurement data $A_{Y1}$ in the same manner.

For example, when the host device 3 causes the inertial sensor module 2 to output the measurement data in the fifth format, the host device 3 performs the calculation using the roll angle data $R_1$, the pitch angle data $P_1$, and the second yaw angle data $Y_2$, performs the calculation using the first-axis second measurement data $G_{Z2}$, the second-axis measurement data $G_{X1}$, and the third-axis measurement data $G_{Y1}$, and determines whether the temperature is included in the first temperature range or the second temperature range based on the value of the temperature data TP. Then, when the temperature is included in the first temperature range, the host device 3 does not change the set value of the format selection register in the fifth format. When the temperature is included in the second temperature range, the host device 3 changes the set value of the format selection register to the sixth format. When the host device 3 causes the inertial sensor module 2 to output the measurement data in the sixth format, the host device 3 performs the calculation using the roll angle data $R_1$, the pitch angle data $P_1$, and the first yaw angle data $Y_1$, performs the calculation using the first-axis first measurement data $G_{Z1}$, the second-axis measurement data $G_{X1}$, and the third-axis measurement data $G_{Y1}$, and determines whether the temperature is included in the first temperature range or the second temperature range based on the value of the temperature data TP. Then, when the temperature is included in the second temperature range, the host device 3 does not change the set value of the format selection register in the sixth format. When the temperature is included in the first temperature range, the host device 3 changes the set value of the format selection register to the fifth format. As described above, the host device 3 determines whether the temperature is included in the first temperature range or the second temperature based on the value of the temperature data TP, and switches the fifth format and the sixth format, so that the accuracy of calculation can be improved regardless of the temperature range.

Other configurations and functions of the inertial measurement system 1 according to the third embodiment are the same as those of the first embodiment or the second embodiment, and thus the description thereof will be omitted.

The inertial measurement system 1 according to the third embodiment described above has the same effect as the inertial measurement system 1 according to the first embodiment or the second embodiment.

Further, according to the inertial measurement system 1 according to the third embodiment, the host device 3 can output the measurement data in the fifth format from the inertial sensor module 2 and perform the calculation based on the first inertial data, or can output the measurement data in the sixth format from the inertial sensor module 2 and perform the calculation based on the second inertial data.

4. Fourth Embodiment

Hereinafter, in an inertial measurement system according to a fourth embodiment, since the same components as those in any one of the first embodiment to the third embodiment are denoted by the same reference numerals, repetitive description as that in any one of the first embodiment to the third embodiment is omitted or simplified, and contents different from those in any one of the first embodiment to the third embodiment will be mainly described.

The structure of the inertial sensor module 2 in the fourth embodiment is the same as that in FIGS. 1 to 4, and thus the illustration thereof is omitted. The functional configuration of the processing device 30 according to the fourth embodiment is the same as that in FIG. 6, and thus the illustration thereof is omitted.

FIG. 10 is a diagram showing a configuration of the inertial measurement system 1 according to the fourth embodiment. As shown in FIG. 10, the inertial measurement system 1 according to the fourth embodiment includes the inertial sensor module 2, the host device 3, and further includes a monitoring device 4. As shown in FIG. 10, the functional configuration of the inertial sensor module 2 in the fourth embodiment is the same as that in FIG. 5.

In the fourth embodiment, the processing device 30 of the inertial sensor module 2 is electrically coupled to the host device 3 and the monitoring device 4 via the terminal THCS, the terminal THCK, the terminal THDI, the terminal THDO, and the terminal THR. The host device 3 and the monitoring device 4 are controllers serving as masters for the processing device 30. Every time a series of calculations for the first detection signal SD1 and the second detection signal SD2 are completed, the processing device 30 outputs a data ready signal DRDY for notifying completion of preparation of measurement data from the terminal THR to the host device 3. Every time the data ready signal DRDY is received from the terminal THR, the host device 3 outputs a chip select signal XHCS, a serial clock signal HSCLK, and a serial data signal HSDI, which is a read command of measurement data as output instruction information, that conform to the SPI communication standard to the processing device 30. The processing device 30 performs the interface process of the SPI communication standard based on the chip select signal XHCS received from the terminal THCS, the serial clock signal HSCLK received from the terminal THCK, and the serial data signal HSDI received from the terminal THDI, and outputs the measurement data to the terminal THDO. The measurement data output from the terminal THDO of the processing device 30 is input to the host device 3 and the monitoring device 4 as the serial data signal HSDO. The processing device 30 may perform an interface process of, for example, an I2C communication standard, a communication standard developed from SPI or I2C, or a communication standard in which a part of the SPI or I2C standard is improved or modified.

The monitoring device 4 monitors the measurement data output from the processing device 30 and transmits output format selection information corresponding to a monitoring result to the processing device 30. That is, the monitoring device 4 monitors the measurement data output from the terminal THDO of the processing device 30, and outputs, to the processing device 30, the chip select signal XHCS, the serial clock signal HSCLK, and the serial data signal HSDI, which is the format selection command of the measurement data as the output format selection information according to the monitoring result.

Specifically, the monitoring device 4 periodically outputs the output format selection information for selecting the first format to the processing device 30. Then, the monitoring device 4 compares the first-axis first measurement data and the first-axis second measurement data included in the measurement data in the first format output from the processing device 30, determines whether the second inertial sensor 20 has a failure based on a comparison result, and outputs the output format selection information according to a determination result to the processing device 30. For example, the monitoring device 4 may determine that the second inertial sensor 20 does not fail if a value of the first-axis second measurement data changes in the same manner while a value of the first-axis first measurement data changes in a predetermined period, and may determine that the second inertial sensor 20 fails if the value of the first-axis second measurement data hardly changes. Alternatively, the monitoring device 4 estimates a period in which the inertial sensor module 2 is stationary based on an output signal of another sensor (not shown). Then, the monitoring device 4 may determine that the second inertial sensor 20 does not fail if both the first-axis first measurement data and the first-axis second measurement data hardly change during the period in which the inertial sensor module 2 is stationary, and may determine that the second inertial sensor 20 fails if the first-axis first measurement data hardly changes and the first-axis second measurement data changes.

Here, the output format selection information output to the processing device 30 when the monitoring device 4 determines that the second inertial sensor 20 does not fail is different from the output format selection information output to the processing device 30 when the monitoring device 4 determines that the second inertial sensor 20 fails. For example, the monitoring device 4 outputs the output format selection information for selecting the second format to the processing device 30 when it is determined that the second inertial sensor 20 does not fail, and outputs the output format selection information for selecting the third format to the processing device 30 when it is determined that the second inertial sensor 20 fails.

As described above, in the fourth embodiment, the host device 3 does not need to monitor presence or absence of the failure in the second inertial sensor 20 and switch the format of the measurement data output from the processing device 30. Therefore, since the host device 3 can concentrate on the calculation process based on the measurement data, the process of the host device 3 can be simplified.

Other configurations and functions of the inertial measurement system 1 according to the fourth embodiment are the same as those of any of the first to third embodiments, and thus the description thereof will be omitted.

The inertial measurement system 1 according to the fourth embodiment described above has the same effect as the inertial measurement system 1 according to the first embodiment, the second embodiment, or the third embodiment.

Further, in the inertial measurement system 1 according to the fourth embodiment, the monitoring device 4 can change the format of the measurement data based on the monitoring result of the measurement data output from the inertial sensor module 2. Specifically, the monitoring device 4 can change the format of the measurement data output from the inertial sensor module 2 depending on the presence or absence of the failure in the second inertial sensor 20. Therefore, the host device 3 can perform the calculation based on the measurement data output from the inertial sensor module 2 regardless of the presence or absence of the failure in the second inertial sensor 20. Further, since the host device 3 can concentrate on the calculation process based on the measurement data, the process of the host device 3 can be simplified.

5. Modifications

The present disclosure is not limited to the embodiments, and various modifications can be made within the scope of the gist of the present disclosure.

For example, in the above first embodiment, an example in which the first format to the third format among the plurality of formats can be selected as the format of the measurement data output from the inertial sensor module 2 is described, and at least the first format of the plurality of formats may be selectable, and at least one of the second format and the third format may be unselectable. Alternatively, at least the second format and the third format among the plurality of formats may be selectable, and the first format may be unselectable.

For example, in the above second embodiment, an example in which the first to fourth formats can be selected from a plurality of formats as the format of the measurement data output from the inertial sensor module 2 is described, and at least the fourth format among the plurality of formats may be selectable, and at least one of the first to third formats may be unselectable.

For example, in the above third embodiment, an example in which the first to sixth formats can be selected from a plurality of formats as the format of the measurement data output from the inertial sensor module 2 is described, and at least the fifth format and the sixth format from among the plurality of formats may be selectable, and at least one of the first to fourth formats may be unselectable.

In the above embodiments, the processing device 30 selects the format of the measurement data by using the format selection command of the measurement data received from the terminal THDI as the output format selection information, and the format of the measurement data may be selected using N-bit control signals received from N terminals as the output format selection information. N is an integer of 1 or more. The number of selectable formats is $2^{N-1}+1$ or more and $2^N$ or less.

In the first to third embodiments, the host device 3 may periodically cause the inertial sensor module 2 to output the measurement data in the first format, and, similarly to the monitoring device 4 of the fourth embodiment, compare the first-axis first measurement data and the first-axis second measurement data included in the measurement data in the first format to determine whether the sensor element 21 fails. Further, the host device 3 may cause the inertial sensor module 2 to output the measurement data in the second format when it is determined that the sensor element 21 does not fail, and may cause the inertial sensor module 2 to output the measurement data in the third format when it is determined that the sensor element 21 fails.

In the above embodiments, the first sensor element 11, the second sensor element 12, the third sensor element 13, and the sensor element 21 each detect an angular velocity, and the fourth sensor element 14, the fifth sensor element 15, and the sixth sensor element 16 each detect an acceleration, and the physical quantity detected by each sensor element is not limited thereto. For example, the first sensor element 11, the second sensor element 12, the third sensor element 13, and the sensor element 21 may each detect the acceleration, and the fourth sensor element 14, the fifth sensor element 15, and the sixth sensor element 16 may each detect the angular velocity.

In the above embodiments, the first inertial sensor 10 includes six sensor elements, and may include four sensor elements. For example, the first sensor element may have the first axis, the second axis, and the third axis as the detection axes, the second sensor element may have the fourth axis as the detection axis, the third sensor element may have the fifth axis as the detection axis, and the fourth sensor element may have the sixth axis as the detection axis. In this case, the first sensor element may detect triaxial angular velocities, and the second sensor element, the third sensor element and the fourth sensor element may each detect a uniaxial acceleration. For example, the first sensor element may have the first axis as the detection axis, the second sensor element may have the second axis as the detection axis, the third sensor element may have the third axis as the detection axis, and the fourth sensor element may have the fourth axis, the fifth axis, and the sixth axis as the detection axes. In this case, the first sensor element, the second sensor element, and the third sensor element may each detect a uniaxial angular velocity, and the fourth sensor element may detect triaxial accelerations.

In the above embodiments, the first inertial sensor 10 includes six sensor elements, and may include five sensor elements. For example, the first sensor element may have the first axis as the detection axis, the second sensor element may have the second axis as the detection axis, the third sensor element may have the third axis as the detection axis, the fourth sensor element may have the fourth axis and the fifth axis as the detection axes, and the fifth sensor element may have the sixth axis as the detection axis. In this case, the first sensor element, the second sensor element, and the third sensor element may each detect a uniaxial angular velocity, the fourth sensor element detects biaxial accelerations, and the fifth sensor element detects a uniaxial acceleration.

In the above embodiments, the first inertial sensor 10 includes six sensor elements, and may include two sensor elements. For example, the first sensor element may have the first axis, the second axis, and the third axis as the detection axes, and the second sensor element may have the fourth axis, the fifth axis, and the sixth axis as the detection axes.

In this case, the first sensor element may detect triaxial angular velocities, and the second sensor element may detect triaxial accelerations.

Figure 11:
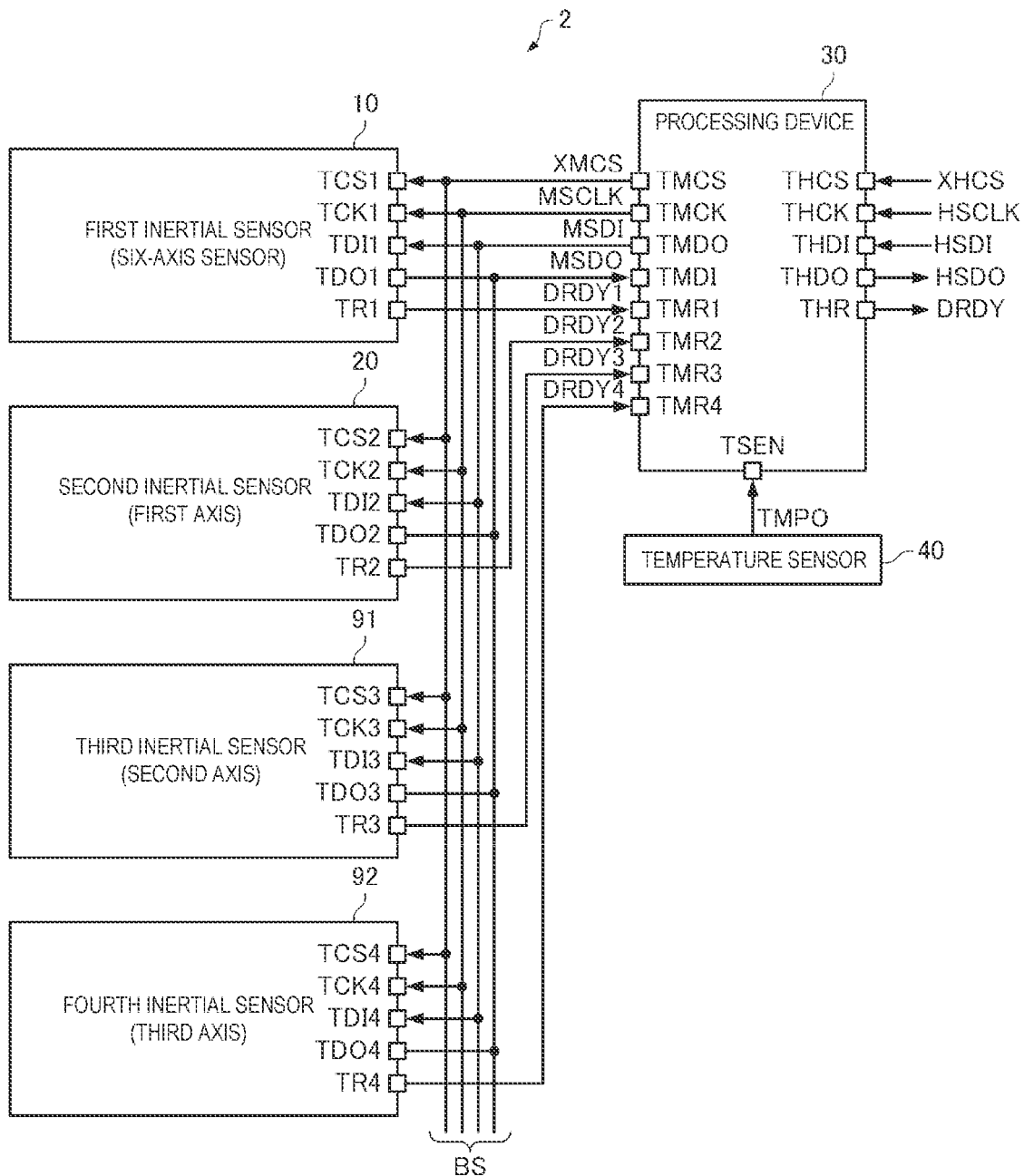
FIG. 11 is a diagram showing a modification of the inertial sensor module.

In the above embodiments, the inertial sensor module 2 includes two inertial sensors, that is, the first inertial sensor 10 and the second inertial sensor 20, and may include three or more inertial sensors. For example, as shown in FIG. 11, the inertial sensor module 2 may further include, in addition to the first inertial sensor 10 and the second inertial sensor 20, a third inertial sensor 91 that detects a physical quantity of the second axis and a fourth inertial sensor 92 that detects a physical quantity of the third axis. For example, the first inertial sensor 10 may be a silicon MEMS sensor, and the second inertial sensor 20, the third inertial sensor 91, and the fourth inertial sensor 92 may be quartz crystal sensors. In this case, for example, the processing device 30 generates first-axis first measurement data, second-axis first measurement data, and third-axis first measurement data based on the first detection signal SD1 output from the first inertial sensor 10, and generates first-axis second measurement data based on the second detection signal SD2 output from the second inertial sensor 20, second-axis second measurement data based on a third detection signal output from the third inertial sensor 91, and third-axis second measurement data based on a fourth detection signal output from the fourth inertial sensor 92. Then, the processing device 30 may output, based on the output format selection information, measurement data including the first-axis first measurement data, the second-axis first measurement data, and the third-axis first measurement data, or measurement data including the first-axis second measurement data, the second-axis second measurement data, and the third-axis second measurement data.

Figure 12:
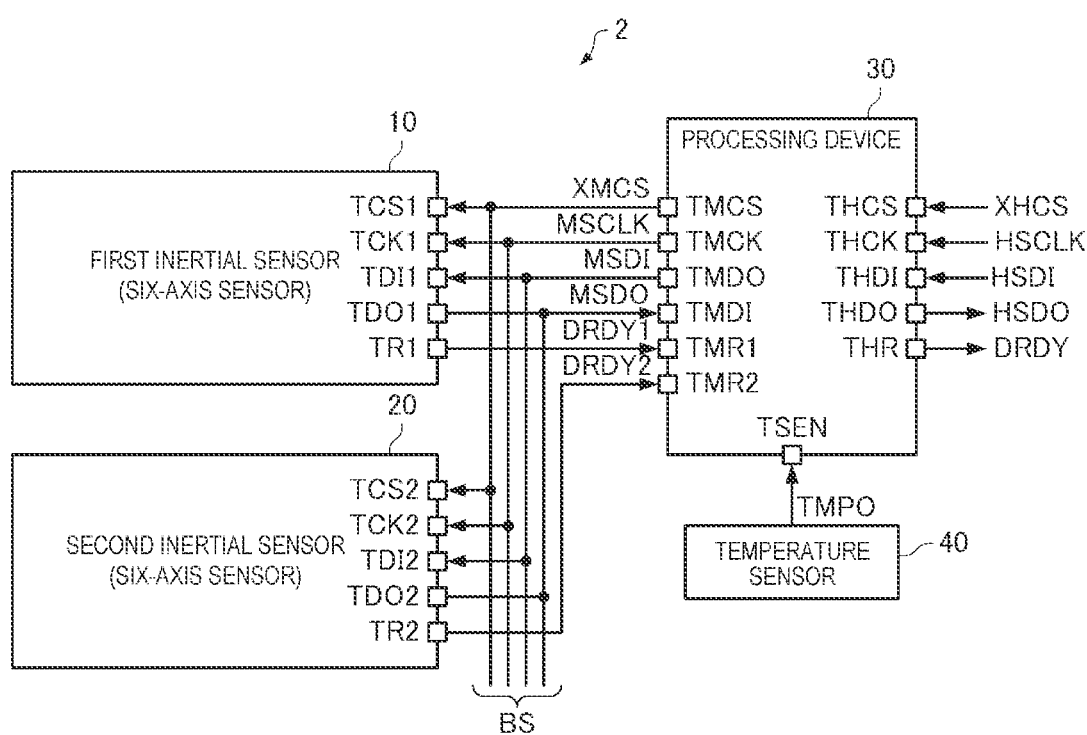
FIG. 12 is a diagram showing a modification of the inertial sensor module.

In the above embodiments, the first inertial sensor 10 detects physical quantities of six axes, and may detect physical quantities of one axis, two axes, three axes, four axes, five axes, or seven or more axes. In the above embodiments, the second inertial sensor 20 detects a physical quantity of one axis, and may detect physical quantities of two or more axes. The first inertial sensor 10 and the second inertial sensor 20 may be sensors having the same structure or sensors having the same detection accuracy. For example, as shown in FIG. 12, each of the first inertial sensor 10 and the second inertial sensor 20 may be a silicon MEMS sensor that detects the physical quantities of six axes. In this case, for example, the processing device 30 calculates n-th-axis first data based on the first detection signal SD1 output from the first inertial sensor 10, and calculates n-th-axis second data based on the second detection signal SD2 output from the second inertial sensor 20. n is an integer of 1 or more and 6 or less. Further, the processing device 30 calculates n-th-axis averaged measurement data based on data obtained by averaging an n-th-axis detection signal included in the first detection signal SD1 output from the first inertial sensor 10 and an n-th-axis detection signal included in the second detection signal SD2 output from the second inertial sensor 20. Then, the processing device 30 may output, based on the output format selection information, the measurement data including the first-axis first measurement data to sixth-axis first measurement data, the measurement data including the first-axis second measurement data to sixth-axis second measurement data, or the measurement data including first-axis averaged measurement data to sixth-axis averaged measurement data.

In the above embodiments, an example in which the first inertial sensor 10 is a silicon MEMS sensor with relatively low detection accuracy, and the second inertial sensor 20 is a quartz crystal sensor with relatively high detection accuracy is described, and the present disclosure is not limited thereto. For example, the first inertial sensor 10 may be a silicon MEMS sensor having relatively low detection accuracy, and the second inertial sensor 20 may be a FOG sensor having relatively high detection accuracy. The FOG is an abbreviation for fiber optic gyroscope. Alternatively, the first inertial sensor 10 may be a sensor with relatively high detection accuracy and the second inertial sensor 20 may be a sensor with relatively low detection accuracy, or the detection accuracy of the first inertial sensor 10 and the detection accuracy of the second inertial sensor 20 may be equal.

In the first embodiment and the second embodiment, an example in which the processing device 30 of the inertial sensor module 2 calculates the posture, the speed, the angle, and the like of the inertial sensor module 2 is described, and a device other than the processing device 30 may calculate the posture, the speed, the angle, and the like of the inertial sensor module 2. For example, the host device 3 may calculate the posture, the speed, the angle, and the like of the inertial sensor module 2.

The embodiments and the modifications described above are merely examples, and the present disclosure is not limited thereto. For example, the embodiments and the modifications can be combined as appropriate.

The present disclosure includes a configuration substantially the same as the configurations described in the embodiments, for example, a configuration having the same function, method, and result, or a configuration having the same object and effect. The present disclosure includes a configuration obtained by replacing a non-essential portion of the configurations described in the embodiments. The present disclosure includes a configuration having the same operation and effect as a configuration described in the embodiments, or a configuration capable of achieving the same object. The present disclosure includes a configuration in which a known technique is added to the configuration described in the embodiments.

The following contents are derived from the above embodiments and modifications.

An aspect of an inertial sensor module includes: a first inertial sensor; a second inertial sensor; and a processing device configured to receive a first detection signal output from the first inertial sensor and a second detection signal output from the second inertial sensor, and output measurement data based on the first detection signal and the second detection signal and based on output instruction information received from outside. The processing device is configured to output the measurement data in a format corresponding to output format selection information received from the outside.

According to the inertial sensor module, since the format of the measurement data output based on the output instruction information received from the outside is selected according to the output format selection information received from the outside, the format of the measurement data can be changed from the outside.

In the aspect of the inertial sensor module, the first inertial sensor may have a first axis, a second axis and a third axis as detection axes, the second inertial sensor may have the first axis as a detection axis, the processing device may output the measurement data in a first format based on the output instruction information when the output format selection information is information of selecting the first format, and the measurement data in the first format may include first-axis first measurement data based on a first-axis detection signal included in the first detection signal, second-axis measurement data based on a second-axis detection signal included in the first detection signal, third-axis measurement data based on a third-axis detection signal included in the first detection signal, and first-axis second measurement data based on a first-axis detection signal included in the second detection signal.

According to the inertial sensor module, an external device can perform a calculation based on the first-axis second measurement data, the second-axis measurement data, and the third-axis measurement data included in the measurement data in the first format.

According to the inertial sensor module, the external device can determine presence or absence of a failure in the first inertial sensor or the second inertial sensor by comparing the first-axis first measurement data and the first-axis second measurement data included in the measurement data in the first format.

In the aspect of the inertial sensor module, the first inertial sensor may have a first axis, a second axis and a third axis as detection axes, the second inertial sensor may have the first axis as a detection axis, the processing device may output the measurement data in a second format based on the output instruction information when the output format selection information is information of selecting the second format, and output the measurement data in a third format based on the output instruction information when the output format selection information is information of selecting the third format, the measurement data in the second format may include first-axis second measurement data based on a first-axis detection signal included in the second detection signal, second-axis measurement data based on a second-axis detection signal included in the first detection signal, and third-axis measurement data based on a third-axis detection signal included in the first detection signal, and the measurement data in the third format may include first-axis first measurement data based on the first-axis detection signal included in the first detection signal, the second-axis measurement data, and the third-axis measurement data.

According to the inertial sensor module, the external device can perform the calculation based on the first-axis second measurement data, the second-axis measurement data, and the third-axis measurement data included in the measurement data in the second format, and can perform the calculation based on the first-axis first measurement data, the second-axis measurement data, and the third-axis measurement data included in the measurement data in the third format.

In the aspect of the inertial sensor module, the processing device may output the measurement data in a second format based on the output instruction information when the output format selection information is information of selecting the second format, and output the measurement data in a third format based on the output instruction information when the output format selection information is information of selecting the third format, the measurement data in the second format may include the first-axis second measurement data, the second-axis measurement data and the third-axis measurement data, the measurement data in the third format may include the first-axis first measurement data, the second-axis measurement data and the third-axis measurement data, the first-axis second measurement data included in the measurement data in the first format, the first-axis second measurement data included in the measurement data in the second format, and the first-axis first measurement data included in the measurement data in the third format may have the same arrangement, the second-axis measurement data included in the measurement data in the first format, the second-axis measurement data included in the measurement data in the second format, and the second-axis measurement data included in the measurement data in the third format may have the same arrangement, and the third-axis measurement data included in the measurement data in the first format, the third-axis measurement data included in the measurement data in the second format, and the third-axis measurement data included in the measurement data in the third format may have the same arrangement.

According to the inertial sensor module, the arrangement of the measurement data of the first axis, the measurement data of the second axis, and the measurement data of the third axis is the same in any of the measurement data in the first format, the measurement data in the second format, and the measurement data in the third format. Therefore, even when any of the measurement data in the first format, the measurement data in the second format, and the measurement data in the third format is output, the external device can perform the calculation using the measurement data of the first axis, the measurement data of the second axis, and the measurement data of the third axis in the same manner.

In the aspect of the inertial sensor module, the processing device may calculate first complementary data at a predetermined time point using the first detection signal at least at two time points, calculate second complementary data at the predetermined time point using the second detection signal at least at two time points, and output the measurement data based on the first complementary data and the second complementary data based on the output instruction information.

According to the inertial sensor module, even when a detection timing and a detection cycle are different between the first inertial sensor and the second inertial sensor, it is possible to output the measurement data including the first complementary data and the second complementary data at the same time point. Therefore, the external device can perform a correct calculation based on the first complementary data and the second complementary data.

In the aspect of the inertial sensor module, the first inertial sensor may have a first axis, a second axis and a third axis as detection axes, the second inertial sensor may have the first axis as a detection axis, the processing device may calculate first-axis first measurement data obtained by correcting a first-axis detection signal included in the first detection signal, second-axis measurement data obtained by correcting a second-axis detection signal included in the first detection signal, third-axis measurement data obtained by correcting a third-axis detection signal included in the first detection signal, and first-axis second measurement data obtained by correcting a first-axis detection signal included in the second detection signal, output the measurement data in a fourth format based on the output instruction information when the output format selection information is information of selecting the fourth format, and the measurement data in the fourth format may include the first-axis first measurement data, the second-axis measurement data, the third-axis measurement data, the first-axis second measurement data, first-axis first detection data that is the first-axis detection signal included in the first detection signal, second-axis detection data that is the second-axis detection signal included in the first detection signal, third-axis detection data that is the third-axis detection signal included in the first detection signal, and first-axis second detection data that is the first-axis detection signal included in the second detection signal.

According to the inertial sensor module, measurement data including the first-axis first detection data, the first-axis first measurement data obtained by correcting the first-axis first detection data, the second-axis detection data, the second-axis measurement data obtained by correcting the second-axis detection data, the third-axis detection data, the third-axis measurement data obtained by correcting the third-axis detection data, the first-axis second detection data, and the first-axis second measurement data obtained by correcting the first-axis second detection data can be output. Therefore, for example, by comparing the first-axis first measurement data, the second-axis measurement data, the third-axis measurement data, and the first-axis second measurement data with the first-axis first detection data, the second-axis detection data, the third-axis detection data, and the first-axis second detection data, respectively, the external device can determine whether a correction process executed by the processing device is normal or evaluate a degree of the correction process, and the like.

In the aspect of the inertial sensor module, the first inertial sensor may have a first axis, a second axis and a third axis as detection axes, the second inertial sensor may have the first axis as a detection axis, the processing device may calculate, when the output format selection information is information of selecting a fifth format, first inertia data including at least one of a posture, a speed, and an angle based on a first-axis detection signal included in the second detection signal, a second-axis detection signal included in the first detection signal, and a third-axis detection signal included in the first detection signal, and output the measurement data in the fifth format including the first inertia data based on the output instruction information, and calculate, when the output format selection information is information of selecting a sixth format, second inertia data including at least one of the posture, the speed, and the angle based on the first-axis detection signal included in the first detection signal, the second-axis detection signal included in the first detection signal, and the third-axis detection signal included in the first detection signal, and output the measurement data in the sixth format including the second inertia data based on the output instruction information.

According to the inertial sensor module, the external device can perform the calculation based on the first inertial data included in the measurement data in the fifth format, or can perform the calculation based on the second inertial data included in the measurement data in the sixth format.

An aspect of an inertial measurement system includes: the aspect of the inertial sensor module; and a monitoring device configured to monitor the measurement data and transmit the output format selection information according to a monitoring result to the processing device.

According to the inertial measurement system, the monitoring device can change the format of the measurement data based on the monitoring result of the measurement data output from the inertial sensor module.

Another aspect of an inertial measurement system includes: the aspect of the inertial sensor module; and a monitoring device configured to monitor the measurement data and transmit the output format selection information according to a monitoring result to the processing device. The monitoring device is configured to compare the first-axis first measurement data and the first-axis second measurement data included in the measurement data in the first format output from the processing device, determine whether the second inertial sensor fails based on a comparison result, and output the output format selection information according to a determination result to the processing device, and the output format selection information output to the processing device when the monitoring device determines that the second inertial sensor does not fail is different from the output format selection information output to the processing device when the monitoring device determines that the second inertial sensor fails.

According to the inertial measurement system, the monitoring device can change the format of the measurement data output from the inertial sensor module depending on presence or absence of a failure in the second inertial sensor. Therefore, the external device can perform the calculation based on the measurement data output from the inertial sensor module regardless of the presence or absence of the failure in the second inertial sensor. Since the external device can concentrate on the calculation process based on the measurement data, the process of the external device can be simplified.

What is claimed is:

1. An inertial sensor module comprising:
   a first inertial sensor configured to detect first measurement data around six axes;
   a second inertial sensor configured to detect second measurement data around one axis; and
   a processing device configured to receive a first detection signal output from the first inertial sensor and a second detection signal output from the second inertial sensor, and output the first and second measurement data based on the first detection signal and the second detection signal and based on output format selection information received from an external device, wherein
   the processing device is configured to output the first and second measurement data in a first data format of a plurality of data formats corresponding to the output format selection information received,
   each of the plurality of data formats includes at least the first measurement data around five axes of the six axes and one of:
      the first measurement data around the one axis of the six axes; and
      the second measurement data around the one axis, and
   the plurality of data formats have different arrangement orders from one another among the first measurement data and the second measurement data.

2. The inertial sensor module according to claim 1, wherein
   the six axes of the first inertial sensor include a first axis, a second axis and a third axis as detection axes,
   the second inertial sensor has the first axis as a detection axis,
   the processing device outputs the first and second measurement data in the first data format based on the output format selection information when the output format selection information is information of selecting the first data format, and
   the first and second measurement data in the first data format includes first-axis first measurement data based on a first-axis detection signal included in the first detection signal, second-axis measurement data based on a second-axis detection signal included in the first detection signal, third-axis measurement data based on a third-axis detection signal included in the first detection signal, and first-axis second measurement data based on a first-axis detection signal included in the second detection signal.

3. The inertial sensor module according to claim 1, wherein
   the six axes of the first inertial sensor include a first axis, a second axis and a third axis as detection axes,
   the second inertial sensor has the first axis as a detection axis,
   the processing device outputs the first and second measurement data in a second data format of the plurality of data formats based on the output format selection information when the output format selection information is information of selecting the second data format, and outputs the first and second measurement data in a third data format of the plurality of data formats based on the output format selection information when the output format selection information is information of selecting the third data format,
   the first and second measurement data in the second data format includes first-axis second measurement data based on a first-axis detection signal included in the second detection signal, second-axis measurement data based on a second-axis detection signal included in the first detection signal, and third-axis measurement data based on a third-axis detection signal included in the first detection signal, and
   the first and second measurement data in the third data format includes first-axis first measurement data based on the first-axis detection signal included in the first detection signal, the second-axis measurement data, and the third-axis measurement data.

4. The inertial sensor module according to claim 2, wherein
   the processing device outputs the first and second measurement data in a second data format of the plurality of data formats based on the output format selection information when the output format selection information is information of selecting the second data format, and outputs the first and second measurement data in a third data format of the plurality of data formats based on the output format selection information when the output format selection information is information of selecting the third data format,
   the first and second measurement data in the second data format includes the first-axis second measurement data, the second-axis measurement data and the third-axis measurement data,
   the first and second measurement data in the third data format includes the first-axis first measurement data, the second-axis measurement data and the third-axis measurement data,
   arrangement of the first-axis second measurement data in the first data format, arrangement of the first-axis second measurement data in the second data format, and arrangement of the first-axis first measurement data in the third data format are the same,
   arrangement of the second-axis measurement data in the first data format, arrangement of the second-axis measurement data in the second data format, and arrangement of the second-axis measurement data in the third data format are the same,
   arrangement of the third-axis measurement data in the first data format, arrangement of the third-axis measurement data in the second data format, and arrangement of the third-axis measurement data in the third data format are the same.

5. The inertial sensor module according to claim 1, wherein
   the processing device is configured to calculate first complementary data at a predetermined time point using the first detection signal at least at two time points, calculate second complementary data at the predetermined time point using the second detection signal at least at two time points, and output the first and second measurement data based on the first complementary data and the second complementary data based on the output format selection information.

6. The inertial sensor module according to claim 1, wherein
the six axes of the first inertial sensor include a first axis, a second axis and a third axis as detection axes,
the second inertial sensor has the first axis as a detection axis,
the processing device is configured to
calculate first-axis first measurement data obtained by correcting a first-axis detection signal included in the first detection signal, second-axis measurement data obtained by correcting a second-axis detection signal included in the first detection signal, third-axis measurement data obtained by correcting a third-axis detection signal included in the first detection signal, and first-axis second measurement data obtained by correcting a first-axis detection signal included in the second detection signal, and
output the first and second measurement data in a fourth data format of the plurality of data formats based on the output format selection information when the output format selection information is information of selecting the fourth data format, and
the first and second measurement data in the fourth data format includes the first-axis first measurement data, the second-axis measurement data, the third-axis measurement data, the first-axis second measurement data, first-axis first detection data that is the first-axis detection signal included in the first detection signal, second-axis detection data that is the second-axis detection signal included in the first detection signal, third-axis detection data that is the third-axis detection signal included in the first detection signal, and first-axis second detection data that is the first-axis detection signal included in the second detection signal.

7. The inertial sensor module according to claim 1, wherein
the six axes of the first inertial sensor include a first axis, a second axis and a third axis as detection axes,
the second inertial sensor has the first axis as a detection axis,
the processing device
calculates, when the output format selection information is information of selecting a fifth data format of the plurality of data formats, first inertia data including at least one of a posture, a speed, and an angle based on a first-axis detection signal included in the second detection signal, a second-axis detection signal included in the first detection signal, and a third-axis detection signal included in the first detection signal, and outputs the first and second measurement data in the fifth data format including the first inertia data based on the output format selection information, and
calculates, when the output format selection information is information of selecting a sixth data format of the plurality of data formats, second inertia data including at least one of the posture, the speed, and the angle based on the first-axis detection signal included in the first detection signal, the second-axis detection signal included in the first detection signal, and the third-axis detection signal included in the first detection signal, and outputs the first and second measurement data in the sixth format including the second inertia data based on the output instruction information.

8. An inertial measurement system comprising:
the inertial sensor module according to claim 1; and
a monitoring device configured to monitor the first and second measurement data and transmit the output format selection information according to a monitoring result to the processing device.

9. An inertial measurement system comprising:
the inertial sensor module according to claim 2; and
a monitoring device configured to monitor the first and second measurement data and transmit the output format selection information according to a monitoring result to the processing device, wherein
the monitoring device is configured to compare the first-axis first measurement data and the first-axis second measurement data included in the first and second measurement data in the first format output from the processing device, determine whether the second inertial sensor fails based on a comparison result, and output the output format selection information according to a determination result to the processing device, and
the output format selection information output to the processing device when the monitoring device determines that the second inertial sensor does not fail is different from the output format selection information output to the processing device when the monitoring device determines that the second inertial sensor fails.

* * * * *